United States Patent
Yang et al.

(10) Patent No.: US 11,172,485 B2
(45) Date of Patent: Nov. 9, 2021

(54) GROUP-COMMON CONTROL INFORMATION

(71) Applicant: QUALCOMM Incorporated, San Diego, CA (US)

(72) Inventors: Wei Yang, San Diego, CA (US); Wanshi Chen, San Diego, CA (US); Heechoon Lee, San Diego, CA (US); Jing Sun, San Diego, CA (US); Xiaoxia Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/518,317

(22) Filed: Jul. 22, 2019

(65) Prior Publication Data

US 2020/0037305 A1 Jan. 30, 2020

Related U.S. Application Data

(60) Provisional application No. 62/703,761, filed on Jul. 26, 2018.

(51) Int. Cl.
| | |
|---|---|
| *H04L 5/00* | (2006.01) |
| *H04W 72/04* | (2009.01) |
| *H04W 72/10* | (2009.01) |

(52) U.S. Cl.
CPC ......... *H04W 72/048* (2013.01); *H04L 5/0035* (2013.01); *H04W 72/042* (2013.01); *H04W 72/10* (2013.01)

(58) Field of Classification Search
CPC . H04W 72/048; H04W 72/10; H04W 72/042; H04W 4/06; H04W 72/005;
(Continued)

(56) References Cited

U.S. PATENT DOCUMENTS

| | | | |
|---|---|---|---|
| 2019/0222284 A1* | 7/2019 | Huang | H04L 5/0053 |
| 2019/0246378 A1* | 8/2019 | Islam | H04W 72/042 |
| 2020/0008216 A1* | 1/2020 | Iyer | H04W 72/1242 |

OTHER PUBLICATIONS

Mediatek Inc: "Discussions on Search Space and CORESET Designs", 3GPP Draft; R1-1718323 Discussions on Search Space and CORESET Designs Final, 3rd Generation Partnership Project (3GPP), Mobile Competence Centre ; 650, Route Des Lucioles ; F-06921 Sophia-Antipolis C, vol. RAN WG1, No. Prague, CZ; Oct. 9, 2017-Oct. 13, 2017, Oct. 8, 2017 (Oct. 8, 2017), XP051341506, 11 Pages, Retrieved from the Internet: URL:http://www.3gpp.org/ftp/Meetings_3GPP_SYNC/RAN1/Docs/ [retrieved on Oct. 8, 2017] Section 2.1, par. 1-4, Section 2.2, Section 3.3.
(Continued)

*Primary Examiner* — Said M Elnoubi
(74) *Attorney, Agent, or Firm* — Holland & Hart LLP

(57) ABSTRACT

Methods, systems, and devices for wireless communications are described. A transmission reception point (TRP) may determine a configuration for downlink transmission of group-common control information associated with a plurality of TRPs. The TRP may identify a set of downlink resources allocated for transmission of the group-common control information. A user equipment (UE) may receive the configuration from at least one TRP of the plurality of TRPs. The UE may monitor downlink resources for reception of the group-common information based on the configuration. The TRP may transmit, and the UE may receive, the group-common control information over the downlink resources. The group-common control information may indicate communication parameters for communications between the UE and at least one TRP.

20 Claims, 20 Drawing Sheets

(58) Field of Classification Search
CPC ... H04L 5/0035; H04L 5/0053; H04L 5/0092; H04L 5/0094
See application file for complete search history.

(56) References Cited

OTHER PUBLICATIONS

Mediatek Inc: "Multi-TRP and Multi-Panel Transmission", 3GPP Draft, R1-1716211 Multiple TRP Final, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339668, 4 Pages, Retrieved from the Internet: URL:http://www.3gpp.org/ftp/Meetings_3GPP_SYNC/RAN1/Docs/[retrieved on Sep. 17, 2017], Section 1, first point, Section 2, subsection "Single PDCCH case".
Partial International Search Report—PCT/US2019/043080—ISA/EPO—dated Nov. 11, 2019.
VIVO: "Design of Group-Common PDCCH", 3GPP Draft; R1-1717485 Design of Group-Common PDCCH, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017 (Oct. 8, 2017), XP051340673, 10 Pages, Retrieved from the Internet: URL:http://www.3gpp.org/ftp/Meetings_3GPP_SYNC/RAN1/Docs/ [retrieved on Oct. 8, 2017], Section 1, first three points, Section 2, Section 3.2, par. 1, 2, Section 3.4, par. 1.
International Search Report and Written Opinion—PCT/US2019/043080—ISA/EPO—dated Jan. 20, 2020.

* cited by examiner

GROUP-COMMON CONTROL INFORMATION

CROSS REFERENCE

The present Application for Patent claims the benefit of U.S. Provisional Patent Application No. 62/703,761 by YANG et al., entitled "GROUP-COMMON CONTROL INFORMATION," filed Jul. 26, 2018, assigned to the assignee hereof, and expressly incorporated by reference herein.

BACKGROUND

The following relates generally to wireless communications, and more specifically to group-common control information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency divisional multiplexing (DFT-S-OFDM). A wireless multiple-access communications system may include a number of base stations or network access nodes, each simultaneously supporting communication for multiple communication devices, which may be otherwise known as user equipment (UE).

In conventional control information techniques, a UE may receive control information associated with communications between the UE and the transmission reception point (TRP) transmitting the control information. In some cases, the control information may be group-common control information, which may provide information on communications between the transmitting TRP and grouped UEs.

In some cases, a UE may communicate with two or more TRPs (e.g., base stations) over time and frequency resources dedicated for uplink and downlink transmissions. In some cases, the TRPs may coordinate (e.g., dynamically or semi-statically) communications with the UE over backhaul links. However, conventional group-common control information techniques may not support coordinated communications between the UE and multiple TRPs. Further, conventional group-common control information techniques may be inefficient in a coordinated TRP scenario, as transmitting group-common control information associated with a single TRP may waste resources or create inconsistencies between control information transmissions.

SUMMARY

The described techniques relate to improved methods, systems, devices, and apparatuses that support group-common control information. Generally, the described techniques may enable a user equipment (UE) to determine which resources to monitor for reception of, and what information may be contained within, group-common control information in a multi-transmission reception point (TRP) setting.

A UE may receive a resource configuration prior to receiving group-common control information. The configuration may indicate to the UE to which TRPs the group-common control information corresponds. In some cases, the control information may correspond to all of the TRPs across a communications system. In some other cases, the group-common control information may correspond to a subset of all the TRPs. In these cases, the group-common control information may include subfields, where each subfield may correspond to a specific TRP. In yet other cases, the group-common control information may correspond to only the TRP which transmits the group-common control information. Based on the configuration, the UE may determine what resources to monitor for reception of the group-common control information. Beneficially, the techniques described herein may enable a UE to determine which TRP(s) of a set of TRPs are associated with group-common control information transmissions in a multi-TRP environment.

A method of wireless communication at a UE is described. The method may include receiving, from a first TRP of a set of TRPs, a configuration for downlink transmission of group-common control information associated with the set of TRPs, monitoring a set of downlink resources allocated for the group-common control information based on the received configuration, and receiving, based on the monitoring, the group-common control information from one or more of the set of TRPs via the set of downlink resources, where the group-common control information indicates a set of communication parameters for communications between the UE and at least one TRP of the set of TRPs.

An apparatus for wireless communication at a UE is described. The apparatus may include a processor, memory coupled with the processor, and instructions stored in the memory. The instructions may be executable by the processor to cause the apparatus to receive, from a first TRP of a set of TRPs, a configuration for downlink transmission of group-common control information associated with the set of TRPs, monitor a set of downlink resources allocated for the group-common control information based on the received configuration, and receive, based on the monitoring, the group-common control information from one or more of the set of TRPs via the set of downlink resources, where the group-common control information indicates a set of communication parameters for communications between the UE and at least one TRP of the set of TRPs.

Another apparatus for wireless communication at a UE is described. The apparatus may include means for receiving, from a first TRP of a set of TRPs, a configuration for downlink transmission of group-common control information associated with the set of TRPs, monitoring a set of downlink resources allocated for the group-common control information based on the received configuration, and receiving, based on the monitoring, the group-common control information from one or more of the set of TRPs via the set of downlink resources, where the group-common control information indicates a set of communication parameters for communications between the UE and at least one TRP of the set of TRPs.

A non-transitory computer-readable medium storing code for wireless communication at a UE is described. The code may include instructions executable by a processor to receive, from a first TRP of a set of TRPs, a configuration for downlink transmission of group-common control information associated with the set of TRPs, monitor a set of downlink resources allocated for the group-common control information based on the received configuration, and receive, based on the monitoring, the group-common control information from one or more of the set of TRPs via the set of downlink resources, where the group-common control information indicates a set of communication parameters for communications between the UE and at least one TRP of the set of TRPs.

In some examples of the method, apparatuses, and non-transitory computer-readable medium described herein, receiving the group-common control information may include operations, features, means, or instructions for receiving joint group-common downlink control information (DCI) associated with communications between the UE and all TRPs of the set of TRPs.

In some examples of the method, apparatuses, and non-transitory computer-readable medium described herein, receiving the group-common control information may include operations, features, means, or instructions for receiving joint group-common DCI including a set of fields associated with communications between the UE and the set of TRPs, where each field indicates communication parameters for communications between the UE and a respective TRP of the set of TRPs.

In some examples of the method, apparatuses, and non-transitory computer-readable medium described herein, receiving the group-common control information may include operations, features, means, or instructions for receiving group-common DCI from a TRP over a control resource set (CORESET), where the CORESET is indicative of the TRP.

In some examples of the method, apparatuses, and non-transitory computer-readable medium described herein, receiving the group-common control information may include operations, features, means, or instructions for receiving multiple group-common DCI messages, where each group-common DCI message indicates communication parameters for communications between the UE and a respective TRP of the set of TRPs.

In some examples of the method, apparatuses, and non-transitory computer-readable medium described herein, the each group-common DCI message may have a same bit size.

Some examples of the method, apparatuses, and non-transitory computer-readable medium described herein may further include operations, features, means, or instructions for receiving a first group-common DCI message from the first TRP over a first CORESET, receiving a second group-common DCI message from a second TRP over a second CORESET and determining communication parameters for the first transmission point based on an identifier (ID) associated with the first CORESET and communication parameters for the second transmission point based on an ID associated with the second CORESET.

Some examples of the method, apparatuses, and non-transitory computer-readable medium described herein may further include operations, features, means, or instructions for identifying a set of Radio Network Temporary IDs (RNTIs) configured for the UE, each RNTI associated with communications between the UE and a respective TRP of the set of TRPs and determining communication parameters for the first TRP based on a first RNTI of the set of RNTIs.

Some examples of the method, apparatuses, and non-transitory computer-readable medium described herein may further include operations, features, means, or instructions for determining communication parameters for a second TRP based on a second RNTI of the set of RNTIs.

Some examples of the method, apparatuses, and non-transitory computer-readable medium described herein may further include operations, features, means, or instructions for identifying a format of the group-common control information based on the configuration and determining the set of communication parameters for communications between the UE and the at least one TRP of the set of TRPs based on the format of the group-common control information.

In some examples of the method, apparatuses, and non-transitory computer-readable medium described herein, the group-common control information includes at least one of a downlink preemption indicator (PI), an uplink PI, a slot format indicator (SFI), a transmit power control (TPC) command, or any combination thereof.

Some examples of the method, apparatuses, and non-transitory computer-readable medium described herein may further include operations, features, means, or instructions for receiving the configuration via a radio resource control (RRC) channel, where the configuration indicates a PI monitoring configuration and monitoring the set of downlink resources based on the PI monitoring configuration.

Some examples of the method, apparatuses, and non-transitory computer-readable medium described herein may further include operations, features, means, or instructions for monitoring the set of downlink resources based on a control information field indicated by the configuration.

In some examples of the method, apparatuses, and non-transitory computer-readable medium described herein, the group-common control information includes a downlink PI.

In some examples of the method, apparatuses, and non-transitory computer-readable medium described herein, the downlink PI indicates a union of time-frequency resources punctured by transmissions from each of the set of TRPs.

Some examples of the method, apparatuses, and non-transitory computer-readable medium described herein may further include operations, features, means, or instructions for determining a set of time-frequency resources punctured by transmissions from a TRP of the set of TRPs based on the downlink PI.

Some examples of the method, apparatuses, and non-transitory computer-readable medium described herein may further include operations, features, means, or instructions for determining a set of spatial layers punctured by transmissions from a TRP of the set of TRPs based on the downlink PI.

In some examples of the method, apparatuses, and non-transitory computer-readable medium described herein, the group-common control information includes a set of downlink PIs, each downlink PI associated with a respective TRP of the set of TRPs and indicates resources preempted by the respective TRP.

In some examples of the method, apparatuses, and non-transitory computer-readable medium described herein, the group-common control information includes an uplink PI.

Some examples of the method, apparatuses, and non-transitory computer-readable medium described herein may further include operations, features, means, or instructions for determining a set of time-frequency resources associated with a transmission from a second UE and withholding an uplink transmission from the UE over the set of time-frequency resources based on the uplink PI.

In some examples of the method, apparatuses, and non-transitory computer-readable medium described herein, the UE withholds uplink transmissions to all TRPs over the set of time-frequency resources.

In some examples of the method, apparatuses, and non-transitory computer-readable medium described herein, the group-common control information includes a set of uplink PIs, each uplink PI may be associated with a respective TRP of the set of TRPs and indicates resources preempted by the respective TRP and the UE withholds uplink transmissions to each respective TRP based on the set of uplink PIs.

In some examples of the method, apparatuses, and non-transitory computer-readable medium described herein, the group-common control information includes an SFI for the UE.

Some examples of the method, apparatuses, and non-transitory computer-readable medium described herein may further include operations, features, means, or instructions for receiving a grant for communications with a second TRP of the set of TRPs, where the grant indicates at least one communication direction for communication between the UE and the second TRP, determining a consistency between the grant and the SFI and communicating with the second TRP based on determining the consistency.

Some examples of the method, apparatuses, and non-transitory computer-readable medium described herein may further include operations, features, means, or instructions for receiving a second group-common control message, where the second group-common control message includes a second SFI corresponding to a second TRP, receiving a grant for communications with a subset of TRPs, where the grant indicates at least one communication direction for communication between the UE and the second TRP, determining a consistency between the grant and the second SFI and communicating with the second TRP based on determining the consistency.

Some examples of the method, apparatuses, and non-transitory computer-readable medium described herein may further include operations, features, means, or instructions for receiving a cell-specific semi-static resource configuration and a UE-specific semi-static resource configuration for the UE, determining a set of resource configurations based on the SFI, the cell-specific semi-static resource configuration, and the UE-specific semi-static resource configuration, prioritizing a first resource configuration of the set of resource configurations over a second resource configuration of the set of resource configurations for at least a portion of time-frequency resources associated with the set of resource configurations and communicating over at least the portion of time-frequency resources according to the prioritized first resource configuration.

In some examples of the method, apparatuses, and non-transitory computer-readable medium described herein, at least one of the cell-specific semi-static resource configuration or the UE-specific semi-static resource configuration identifies a communication direction for resources allocated for communication between the UE and a set of TRPs of the set of TRPs and the communication direction includes one of downlink, uplink, or flexible.

In some examples of the method, apparatuses, and non-transitory computer-readable medium described herein, receiving the cell-specific semi-static resource configuration and the UE-specific semi-static resource configuration may include operations, features, means, or instructions for receiving respective cell-specific resource configurations and UE-specific resource configurations from each TRP of the set of TRPs, where each cell-specific resource configuration and UE-specific resource configuration indicates a communication direction for communications between the UE and a set of TRPs of the set of TRPs.

Some examples of the method, apparatuses, and non-transitory computer-readable medium described herein may further include operations, features, means, or instructions for receiving a joint SFI that indicates a slot format for communications between the UE and the set of TRPs, where the joint SFI may be consistent with all cell-specific resource configurations.

Some examples of the method, apparatuses, and non-transitory computer-readable medium described herein may further include operations, features, means, or instructions for receiving a set of SFIs, each SFI corresponding to a respective TRP of the set of TRPs and indicates a slot format for communications between the UE and the respective TRP, and each SFI may be consistent with the cell-specific resource configuration from the respective TRP of the set of TRPs.

Some examples of the method, apparatuses, and non-transitory computer-readable medium described herein may further include operations, features, means, or instructions for receiving a joint SFI that indicates a slot format for communications between the UE and the set of TRPs and canceling semi-statically configured communications between the UE and the set of TRPs on resources that may have a contradicting communication direction between the SFI and the UE-specific resource configurations.

Some examples of the method, apparatuses, and non-transitory computer-readable medium described herein may further include operations, features, means, or instructions for receiving a set of SFIs, each SFI corresponding to a respective TRP of the set of TRPs and indicates a slot format for communications between the UE and the respective TRP and canceling semi-statically configured communications between the UE and each respective TRP on resources that may have a contradicting communication direction between the each SFI of the set of SFIs and the UE-specific resource configuration from the respective TRP.

In some examples of the method, apparatuses, and non-transitory computer-readable medium described herein, receiving the cell-specific resource configuration may include operations, features, means, or instructions for receiving the cell-specific semi-static resource configuration for multiple TRPs from only one TRP of the set of TRPs.

Some examples of the method, apparatuses, and non-transitory computer-readable medium described herein may further include operations, features, means, or instructions for receiving a joint SFI that indicates a slot format for communications between the UE and the set of TRPs, where the joint SFI may be consistent with the cell-specific semi-static resource configuration.

Some examples of the method, apparatuses, and non-transitory computer-readable medium described herein may further include operations, features, means, or instructions for receiving a set of SFIs, each SFI corresponding to a respective TRP of the set of TRPs and indicates a slot format for communications between the UE and the respective TRP, where all SFIs may be consistent with the cell-specific semi-static resource configuration.

In some examples of the method, apparatuses, and non-transitory computer-readable medium described herein, receiving the UE-specific semi-static resource configuration may include operations, features, means, or instructions for receiving the UE-specific semi-static resource configuration for multiple TRPs from only one TRP of the set of TRP.

In some examples of the method, apparatuses, and non-transitory computer-readable medium described herein, the SFI indicates a slot format for communications between the UE and the set of TRPs and canceling semi-statically configured communications between the UE and the set of TRPs on resources that may have a contradicting communication direction between the SFI and the UE-specific semi-static resource configuration.

Some examples of the method, apparatuses, and non-transitory computer-readable medium described herein may further include operations, features, means, or instructions for receiving a set of SFIs, each SFI corresponding to a respective TRP of the set of TRPs and indicates a slot format for communications between the UE and the respective TRP and canceling semi-static configured communications between the UE and each respective TRP on resources that may have a contradicting communication direction between the SFI and the UE-specific semi-static resource configuration.

Some examples of the method, apparatuses, and non-transitory computer-readable medium described herein may further include operations, features, means, or instructions for receiving the cell-specific semi-static resource configuration for multiple TRPs from only one TRP of the set of TRPs and receiving multiple UE-specific resource configurations from respective TRPs of the set of TRPs.

Some examples of the method, apparatuses, and non-transitory computer-readable medium described herein may further include operations, features, means, or instructions for determining an inconsistency between the first resource configuration and the second resource configuration, where the prioritizing may be based on the inconsistency.

In some examples of the method, apparatuses, and non-transitory computer-readable medium described herein, the group-common control information includes a TPC command for communications between the UE and the at least one TRP.

In some examples of the method, apparatuses, and non-transitory computer-readable medium described herein, the group-common control information includes a set of TPC commands, each TPC command associated with communications between the UE and a respective TRP of the set of TRPs.

A method of wireless communication at a first TRP of a set of TRPs is described. The method may include determining a configuration for downlink transmission of group-common control information associated with the set of TRPs, identifying a set of downlink resources allocated for transmission of the group-common control information based on the configuration, and transmitting the group-common control information to a UE via the set of downlink resources, where the group-common control information indicates a set of communication parameters for communications between the UE and at least one TRP of the set of TRPs.

An apparatus for wireless communication at a first TRP of a set of TRPs is described. The apparatus may include a processor, memory coupled with the processor, and instructions stored in the memory. The instructions may be executable by the processor to cause the apparatus to determine a configuration for downlink transmission of group-common control information associated with the set of TRPs, identify a set of downlink resources allocated for transmission of the group-common control information based on the configuration, and transmit the group-common control information to a UE via the set of downlink resources, where the group-common control information indicates a set of communication parameters for communications between the UE and at least one TRP of the set of TRPs.

Another apparatus for wireless communication at a first TRP of a set of TRPs is described. The apparatus may include means for determining a configuration for downlink transmission of group-common control information associated with the set of TRPs, identifying a set of downlink resources allocated for transmission of the group-common control information based on the configuration, and transmitting the group-common control information to a UE via the set of downlink resources, where the group-common control information indicates a set of communication parameters for communications between the UE and at least one TRP of the set of TRPs.

A non-transitory computer-readable medium storing code for wireless communication at a first TRP of a set of TRPs is described. The code may include instructions executable by a processor to determine a configuration for downlink transmission of group-common control information associated with the set of TRPs, identify a set of downlink resources allocated for transmission of the group-common control information based on the configuration, and transmit the group-common control information to a UE via the set of downlink resources, where the group-common control information indicates a set of communication parameters for communications between the UE and at least one TRP of the set of TRPs.

In some examples of the method, apparatuses, and non-transitory computer-readable medium described herein, transmitting the group-common control information may include operations, features, means, or instructions for transmitting joint group-common DCI associated with communications between the UE and all TRPs of the set of TRPs.

In some examples of the method, apparatuses, and non-transitory computer-readable medium described herein, transmitting the group-common control information may include operations, features, means, or instructions for transmitting joint group-common DCI including a set of fields associated with communications between the UE and the set of TRPs, where each field indicates communication parameters for communications between the UE and a respective TRP of the set of TRPs.

In some examples of the method, apparatuses, and non-transitory computer-readable medium described herein, transmitting the group-common control information may include operations, features, means, or instructions for transmitting a group-common DCI message that indicates communication parameters for communications between the UE and the first TRP.

Some examples of the method, apparatuses, and non-transitory computer-readable medium described herein may further include operations, features, means, or instructions for receiving, from one or more TRPs of the set of TRPs, a subset of the communication parameters for communications between the UE and the one or more TRPs, where the group-common control information indicates the subset of the communication parameters.

Some examples of the method, apparatuses, and non-transitory computer-readable medium described herein may further include operations, features, means, or instructions for configuring the UE with a RNTI for communications between the UE and the first TRP.

Some examples of the method, apparatuses, and non-transitory computer-readable medium described herein may further include operations, features, means, or instructions for configuring the UE with a set of RNTIs, each RNTI associated with communications between the UE and a respective TRP of the set of TRPs.

Some examples of the method, apparatuses, and non-transitory computer-readable medium described herein may further include operations, features, means, or instructions for identifying a format for the group-common control information, where the set of communication parameters may be based on the format.

Some examples of the method, apparatuses, and non-transitory computer-readable medium described herein may further include operations, features, means, or instructions for transmitting an indication of the configuration to the UE, where the indication may be transmitted via an RRC channel and includes a PI configuration.

In some examples of the method, apparatuses, and non-transitory computer-readable medium described herein, the group-common control information includes a downlink PI.

Some examples of the method, apparatuses, and non-transitory computer-readable medium described herein may further include operations, features, means, or instructions for determining a set of time-frequency resources punctured by transmissions from a TRP of the set of TRPs based on the downlink PI and withholding a downlink transmission to the UE over the set of time-frequency resources.

Some examples of the method, apparatuses, and non-transitory computer-readable medium described herein may further include operations, features, means, or instructions for determining a set of spatial layers punctured by transmissions from a TRP of the set of TRPs based on the downlink PI and withholding a downlink transmission to the UE over the set of spatial layers.

In some examples of the method, apparatuses, and non-transitory computer-readable medium described herein, the group-common control information includes a set of downlink PIs, each downlink PI associated with a respective TRP of the set of TRPs and indicates resources preempted by the respective TRP.

In some examples of the method, apparatuses, and non-transitory computer-readable medium described herein, the group-common control information includes an uplink PI.

Some examples of the method, apparatuses, and non-transitory computer-readable medium described herein may further include operations, features, means, or instructions for determining a set of uplink resources associated with a transmission from a second UE based on the uplink PI and refraining from monitoring the set of uplink resources for an uplink transmission from the UE over the set of time-frequency resources.

In some examples of the method, apparatuses, and non-transitory computer-readable medium described herein, the group-common control information includes an SFI for the UE.

Some examples of the method, apparatuses, and non-transitory computer-readable medium described herein may further include operations, features, means, or instructions for transmitting a cell-specific semi-static resource configuration to the UE and communicating with the UE according to the cell-specific semi-static resource configuration.

In some examples of the method, apparatuses, and non-transitory computer-readable medium described herein, the cell-specific semi-static resource configuration may be associated with multiple TRPs of the set of TRPs, where the cell-specific semi-static resource configuration indicates a communication direction for communications between the UE and the multiple TRPs of the set of TRPs.

Some examples of the method, apparatuses, and non-transitory computer-readable medium described herein may further include operations, features, means, or instructions for transmitting a UE-specific semi-static resource configuration to the UE and communicating with the UE according to the UE-specific semi-static resource configuration.

In some examples of the method, apparatuses, and non-transitory computer-readable medium described herein, the group-common control information includes a TPC command for communications between the UE and the at least one TRP.

In some examples of the method, apparatuses, and non-transitory computer-readable medium described herein, the group-common control information includes a set of TPC commands, each TPC command associated with communications between the UE and a respective TRP of the set of TRPs.

DETAILED DESCRIPTION

Figure 1:
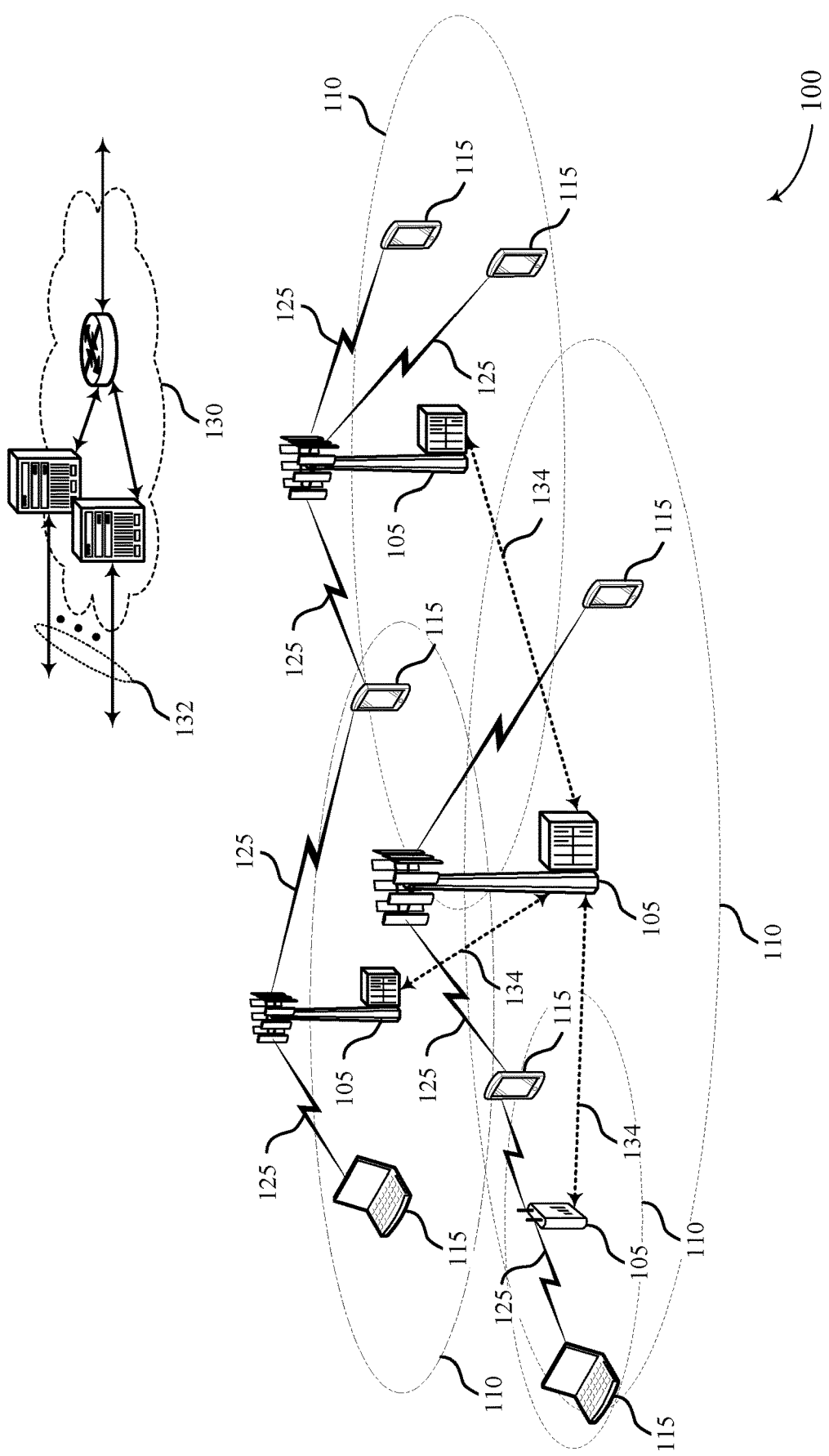
FIG. 1 illustrates an example of a wireless communications system that supports group-common control information in accordance with aspects of the present disclosure.

The described techniques relate to a user equipment (UE) determining transmission reception points (TRPs) of a set of TRPs to which control information corresponds based on a configuration in a multi-TRP setting. In some cases, such as in New Radio (NR), multiple TRPs may be supported for communicating with the same UE. For instance, multiple TRPs may communicate with the same UE at the same (or different) time in a non-coherent manner, which may be referred to as Non-Coherent Joint Transmission (NCJT).

In some cases, communications between a UE and multiple TRPs may be coordinated between the multiple TRPs. For example, TRPs may communicate with one another via backhaul link. In some cases, if there is large latency associated with the backhaul links, the TRPs may communicate Radio Resource Control (RRC) messages only via the backhaul link (e.g., TRPs may not exchange dynamic scheduling messages such as downlink control information (DCI) signaling). TRPs with coordinated communications may allow for more efficient communications between the TRPs and the UE.

However, conventional control information techniques may not take these coordinated communications into consideration. For example, conventional control information techniques may be on a per TRP-basis. As an example, the control information transmitted by a TRP may be exclusively associated with communications between the UE and the transmitting TRP. In such a scenario, the control information may not take into account coordinated transmissions from other TRPs. The other TRPs may therefore transmit other control information messages to the UE. This may result in excessive usage of system resources. Further, multiple, uncoordinated control information transmissions provided in conventional techniques may transmit conflicting information to a UE.

According to the techniques described herein, a wireless device, such as a UE, may receive a group-common control information configuration from a TRP in a multi-TRP setting. The group-common control information configuration may indicate a set of downlink control resources for the UE to monitor for reception of group-common control information. The group-common control information configuration may indicate to the UE a type of configuration group-common control information transmissions may implement. For example, the group-common control information may provide information on communications with a single TRP. In another example, the group-common control information may provide information on communications with a subset of TRPs. In yet another example, the group-common control information may provide information on communications with all TRPs in a system capable of communicating with the UE.

Further, the group-common control information may provide different types of information relating to communications with the UE. In some cases, the group-common control information may provide a preemption indicator (PI). A PI may indicate resources, or spatial layers, of scheduled communications of the UE which are punctured by prioritized communications. The PI may be in the downlink or in the uplink. Additionally or alternatively, the group-common control information may provide transmit power control (TPC) parameters. The UE may transmit communications according to the TPC indicators (e.g., transmitting a communication with a power level as specified by the TPC parameters). Additionally or alternatively, the group-common control information may provide one or more slot format indicators (SFIs). SFIs may indicate a subframe structure for communications with the UE. For example, SFIs may indicate a communication to have a number of downlink slots, a number of uplink slots, and a number of flexible slots.

Each example above may rely on different downlink resources and may implement different transmission structures than the others. Thus, when the resource configuration is provided to the UE, the UE may be able to determine which resources to monitor for group-common control information, and what information to expect within the group-common control information.

Aspects of the disclosure are initially described in the context of wireless communications systems. Aspects are then described with respect to a group-common control information communication and a process flow. Aspects of the disclosure are further illustrated by and described with reference to control information communications, apparatus diagrams, system diagrams, and flowcharts that relate to group-common control information.

FIG. 1 illustrates an example of a wireless communications system 100 that supports group-common control information in accordance with aspects of the present disclosure. The wireless communications system 100 includes TRPs 105 (e.g., base stations), UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

TRPs 105 may wirelessly communicate with UEs 115 via one or more TRP antennas. TRPs 105 described herein may include or may be referred to by those skilled in the art as a base transceiver station, a radio TRP, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include TRPs 105 of different types (e.g., macro or small cell TRPs). The UEs 115 described herein may be able to communicate with various types of TRPs 105 and network equipment including macro eNBs, small cell eNBs, gNBs, relay TRPs, and the like.

Each TRP 105 may be associated with a particular geographic coverage area 110 in which communications with various UEs 115 is supported. Each TRP 105 may provide communication coverage for a respective geographic coverage area 110 via communication links 125, and communication links 125 between a TRP 105 and a UE 115 may utilize one or more carriers. Communication links 125 shown in wireless communications system 100 may include uplink transmissions from a UE 115 to a TRP 105, or downlink transmissions from a TRP 105 to a UE 115. Downlink transmissions may also be called forward link transmissions while uplink transmissions may also be called reverse link transmissions.

The geographic coverage area 110 for a TRP 105 may be divided into sectors making up only a portion of the geographic coverage area 110, and each sector may be associated with a cell. For example, each TRP 105 may provide communication coverage for a macro cell, a small cell, a hot spot, or other types of cells, or various combinations thereof. In some examples, a TRP 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same TRP 105 or by different TRPs 105. The wireless communications system 100 may include, for example, a heterogeneous LTE/LTE-A/LTE-A Pro or NR network in which different types of TRPs 105 provide coverage for various geographic coverage areas 110.

The term "cell" refers to a logical communication entity used for communication with a TRP 105 (e.g., over a carrier), and may be associated with an identifier (ID) for distinguishing neighboring cells (e.g., a physical cell ID (PCID), a virtual cell ID (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a TRP 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a TRP 105. Other UEs 115 in such a group may be outside the geographic coverage area 110 of a TRP 105, or be otherwise unable to receive transmissions from a TRP 105. In some cases, groups of UEs 115 communicating via D2D communications may utilize a one-to-many (1:M) system in which each UE 115 transmits to every other UE 115 in the group. In some cases, a TRP 105 facilitates the scheduling of resources for D2D communications. In other cases, D2D communications are carried out between UEs 115 without the involvement of a TRP 105.

TRPs 105 may communicate with the core network 130 and with one another. For example, TRPs 105 may interface with the core network 130 through backhaul links 132 (e.g., via an S1, N2, N3, or other interface). TRPs 105 may communicate with one another over backhaul links 134 (e.g., via an X2, Xn, or other interface) either directly (e.g., directly between TRPs 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by TRPs 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a TRP 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or TRP 105 may be distributed across various network devices (e.g., radio heads and access network controllers) or consolidated into a single network device (e.g., a TRP 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and TRPs 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as TRPs 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, TRP 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a TRP 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a TRP 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a TRP 105 may use multiple antennas or antenna arrays to conduct beamforming operations for directional communications with a UE 115. For instance, some signals (e.g., synchronization signals, reference signals, beam selection signals, or other control signals) may be transmitted by a TRP 105 multiple times in different directions, which may include a signal being transmitted according to different beamforming weight sets associated with different directions of transmission. Transmissions in different beam directions may be used to identify (e.g., by the TRP 105 or a receiving device, such as a UE 115) a beam direction for subsequent transmission or reception by the TRP 105. Some signals, such as data signals associated with a particular receiving device, may be transmitted by a TRP 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the TRP 105 in different directions, and the UE 115 may report to the TRP 105 an indication of the signal it received with a highest signal quality, or an otherwise acceptable signal quality. Although these techniques are described with reference to signals transmitted in one or more directions by a TRP 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the TRP 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a TRP 105 or UE 115 may be located within one or more antenna arrays, which may support MIMO operations, or transmit or receive beamforming. For example, one or more TRP antennas or antenna arrays may be co-located at an antenna assembly, such as an antenna tower. In some cases, antennas or antenna arrays associated with a TRP 105 may be located in diverse geographic locations. A TRP 105 may have an antenna array with a number of rows and columns of antenna ports that the TRP 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a TRP 105 or core network 130 supporting radio bearers for user plane data. At the Physical (PHY) layer, transport channels may be mapped to physical channels.

In some cases, UEs 115 and TRPs 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a TRP 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency divisional multiplexing (OFDM) or discrete Fourier transform-spread-OFDM (DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., TRPs 105 or UEs 115) may have a hardware configuration that supports communications over a particular carrier bandwidth, or may be configurable to support communications over one of a set of carrier bandwidths. In some examples, the wireless communications system 100 may include TRPs 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link 132 or 134). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other component carriers. A shorter symbol duration may be associated with increased spacing between adjacent subcarriers. A device, such as a UE 115 or TRP 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A TRP 105 of wireless communications system 100 may determine a configuration for group-common downlink information to be transmitted to a UE 115. The configuration may indicate the types of information to be included (e.g., PIs, SFI, TPC) in the group-common control information, as well as TRPs 105 associated the information provided in the group-common control information. For example, the group-common control information may correspond to communications between UE 115 and a single TRP 105, a subset of TRPs 105 of wireless communications system 100, or all TRPs 105 in wireless communications system 100. In some cases, the TRP 105 may receive the configuration, or portions of the configuration, from another TRP 105 or TRPs 105 (e.g., via a backhaul link(s) 132 or 134). Based on the configuration, the TRP 105 may determine downlink resources to transmit the group-common control information over to UE 115.

A UE 115 may receive the configuration from one or more TRPs 105. UE 115 may determine, based on the configuration, resources to monitor for the group-common control information. Additionally, UE 115 may identify TRPs 105 corresponding to the group-common control information based on the configuration. UE 115 may then receive the group-common control information within the monitored downlink resources.

Figure 2:
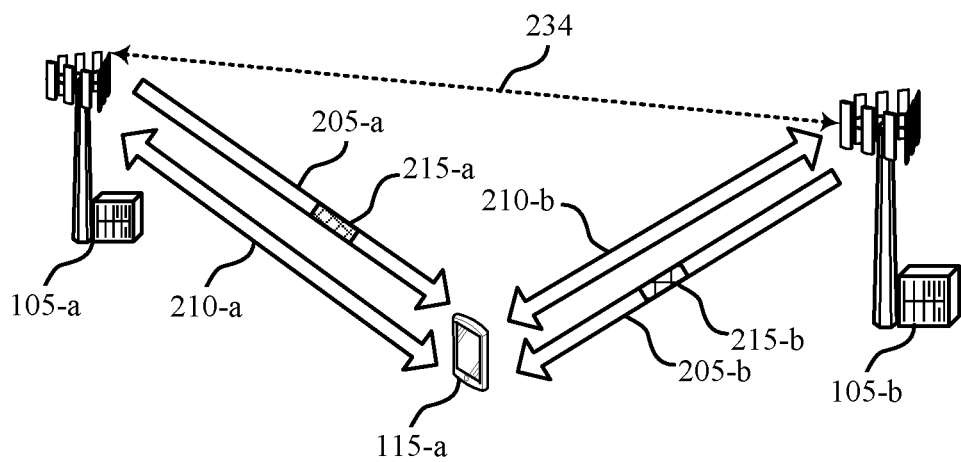
FIG. 2 illustrates an example of a wireless communications system that supports group-common control information in accordance with aspects of the present disclosure.

FIG. 2 illustrates an example of a wireless communications system 200 that supports group-common control information in accordance with aspects of the present disclosure. In some examples, wireless communications system 200 may implement aspects of wireless communications system 100. The wireless communications system 200 may include UE 115-a, TRP 105-a, and TRP 105-b, which may be examples of the corresponding devices described herein. In some examples, TRP 105-a and TRP 105-b may be referred to as base stations. As shown, UE 115-a may communicate with TRP 105-a via a channel 210, such as channel 210-a. Further, UE 115-a may communicate with TRP 105-b via channel 210-b. In some cases, TRPs 105-a and 105-b may communicate using backhaul link 234. TRP 105-a may transmit a group-common DCI transmission 215, such as group-common DCI transmission 215-a over a downlink (e.g., downlink 205-a), which may in some cases be channel 210-a. Similarly, TRP 105-b may transmit a group-common DCI transmission 215-b over a downlink 205-b, which may in some cases be channel 210-b. The wireless communications system 200 may also operate according to a radio access technology (RAT) such as a fifth generation (5G) or NR RAT, although techniques described herein may be applied to any RAT.

In some cases, wireless communications system 200 may schedule communication resources to support both uplink and downlink transmissions. For instance, wireless communications system 200 may allocate a first set of resources to downlink transmissions, and a second set of resources to uplink transmissions. If the wireless communications system 200 utilizes FDD for communications, then uplink and downlink transmissions may occur simultaneously. That is, the wireless communications system 200 may allocate a first set of frequencies to uplink transmissions and a second set of frequencies to downlink transmissions. In some cases, if TDD is supported for communications, then uplink and downlink transmissions may not occur simultaneously. That is, wireless communications system 200 may allocate frequency resources to downlink transmissions during a first interval (e.g., one or more subframes or TTIs) and uplink transmissions during a second interval (e.g., a subsequent subframe or TTI). In some cases, wireless communications system 200 may also use a combination of FDD and TDD techniques.

A TRP (e.g., TRP 105-*a* or TRP 105-*b*) may transmit group-common DCI (e.g., group-common DCI transmission 215-*a* or group-common DCI transmission 215-*b*) to UE 115-*a*. Group-common DCI included in group-common DCI transmission 215 may provide various types of information related to the scheduled uplink and downlink transmissions with UE 115-*a* (e.g., over channel 210-*a* or channel 210-*b*). In some cases, group-common DCI may include downlink PIs, which may indicate a set of resources of scheduled downlink transmissions, spatial layers of scheduled transmissions, or both that are punctured by other communications. Additionally or alternatively, group-common DCI may include uplink PIs, which may indicate a set of uplink transmissions the UE 115-*a* refrains from transmitting. Additionally or alternatively, group-common DCI may include TPC parameters, which the UE 115-*a* may implement for uplink transmissions. Additionally or alternatively, group-common DCI may include SFIs, which may indicate slot structure (e.g., uplink, downlink, or flexible slots or TTIs) for a set of transmissions.

Group-common DCI may provide information on communications between UE 115-*a* and various TRPs such as TRP 105-*a* or TRP 105-*b*. For example, group-common DCI included in group-common DCI transmission 215-*a* or 215-*b* may provide information on communications between UE and TRP 105-*a* over channel 210-*a*. In other cases, group-common DCI may provide information on communications between UE 115-*a* and a subset of TRPs in wireless communications system 200, such as TRP 105-*a* and TRP 105-*b*. In yet other cases, group-common DCI may provide information on communications between UE 115-*a* and all TRPs in wireless communications system 200 (e.g., other TRPs not shown in wireless communications system 200).

Group-common DCI resource allocation and frame structure may vary depending on the TRPs 105 to which the group-common DCI corresponds. For example, a group-common DCI transmission may provide information regarding communications between UE 115-*a* and a subset of TRPs 105 of wireless communications system 200. In this case, a group-common DCI transmission 215 may include a set of fields, where each field may correspond to a TRP (e.g., TRP 105-*a* or TRP 105-*b*) of the subset of TRPs. In another example, a group-common DCI transmission 215 may provide common information regarding communications between UE 115-*a* and all TRPs 105 of wireless communications system 200. In this example, the group-common DCI transmission 215 may rely on a single field to carry DCI and the control information contained in this field may apply to communications between the UE 115-*a* and all TRPs 105.

In another example, group-common DCI (e.g., group-common DCI transmission 215-*a* or 215-*b*) may provide information regarding communications between UE 115-*a* and one TRP 105 of wireless communications system 200. As in the previous example, since group-common DCI corresponds to one TRP 105, the group-common DCI transmission 215-*a* or 215-*b* may rely on a single field to carry DCI. Further, each group-common DCI transmission 215-*a* or 215-*b* (e.g., each from a different TRP 105) may include the same number of bits. That is, an RRC message may configure a single DCI size for all the group-common DCIs for a given DCI format. This may minimize the number of blind decodes UE 115-*a* may perform on group-common DCI messages.

Additionally, UE 115-*a* may identify to which TRP 105 a group-common DCI transmission corresponds in several ways. For example, UE 115-*a* may identify an associated TRP (e.g., one of TRP 105-*a* or TRP 105-*b*) based on a control resource set (CORESET) that group-common DCI is transmitted over (e.g., the CORESET may indicate the origin of the group-common DCI). Alternatively, UE 115-*a* may be configured with a set of Radio Network Temporary IDs (RNTIs) for a given DCI format. Each RNTI may correspond to a TRP 105 of wireless communications system 200. UE 115-*a* may identify the associated TRP based on the set of RNTIs.

Different information types of a group-common DCI transmission 215 may correspond to different TRP groups. A DCI transmission may include multiple information types. For example, group-common DCI transmission may include SFI, PIs, and TPC. However, each information type may correspond to different TRP groups. For example, SFI may correspond to TRP 105-*a* which transmitted group-common DCI transmission 215-*a*. PIs may correspond to all TRPs 105 in wireless communications system 200. TPC may correspond to a subset of TRPs (e.g., TRP 105-*a* and TRP 105-*b*) in wireless communications system 200.

UE 115-*a* may receive a resource configuration from one or more TRPs to determine which TRPs 105 correspond to group-common DCI. A resource configuration message may be transmitted by TRP 105-*a*, TRP 105-*b*, or both (e.g., in a corresponding CORESET from a TRP 105). The resource configuration message may indicate to UE 115-*a* which TRPs 105 correspond to group-common DCI. In some cases, different TRP groups may correspond to different information contained within group-common DCI transmission 215, as discussed above.

In some cases, UE 115-*a* may determine corresponding TRPs 105 based on fields and configurations for the group-common DCI and indicated by a group-common DCI configuration message. For example, the group-common DCI configuration message (e.g., received from TRP 105-*a*) may indicate that UE 115-*a* is configured with a downlink PI configuration and one DCI field. UE 115-*a* may determine, based on the resource configuration message, that group-common DCI corresponds to multiple TRPs 105 (e.g., TRP 105-*a* and TRP 105-*b*). In another example, the group-common DCI configuration message may indicate that UE 115-*a* is configured with a downlink PI configuration and multiple DCI fields. UE 115-*a* may determine group-common DCI may correspond to a subset of TRPs (e.g., TRP 105-*a* and TRP 105-*b*) based on the group-common DCI configuration message. In another example, the group-common DCI configuration message may indicate that UE 115-*a* is configured with multiple PI RNTIs. UE 115-*a* may determine a group-common DCI may correspond to a specific TRP 105 (e.g., TRP 105-*a*) of wireless communications system 200 based on the group-common DCI configuration message.

Figure 3:
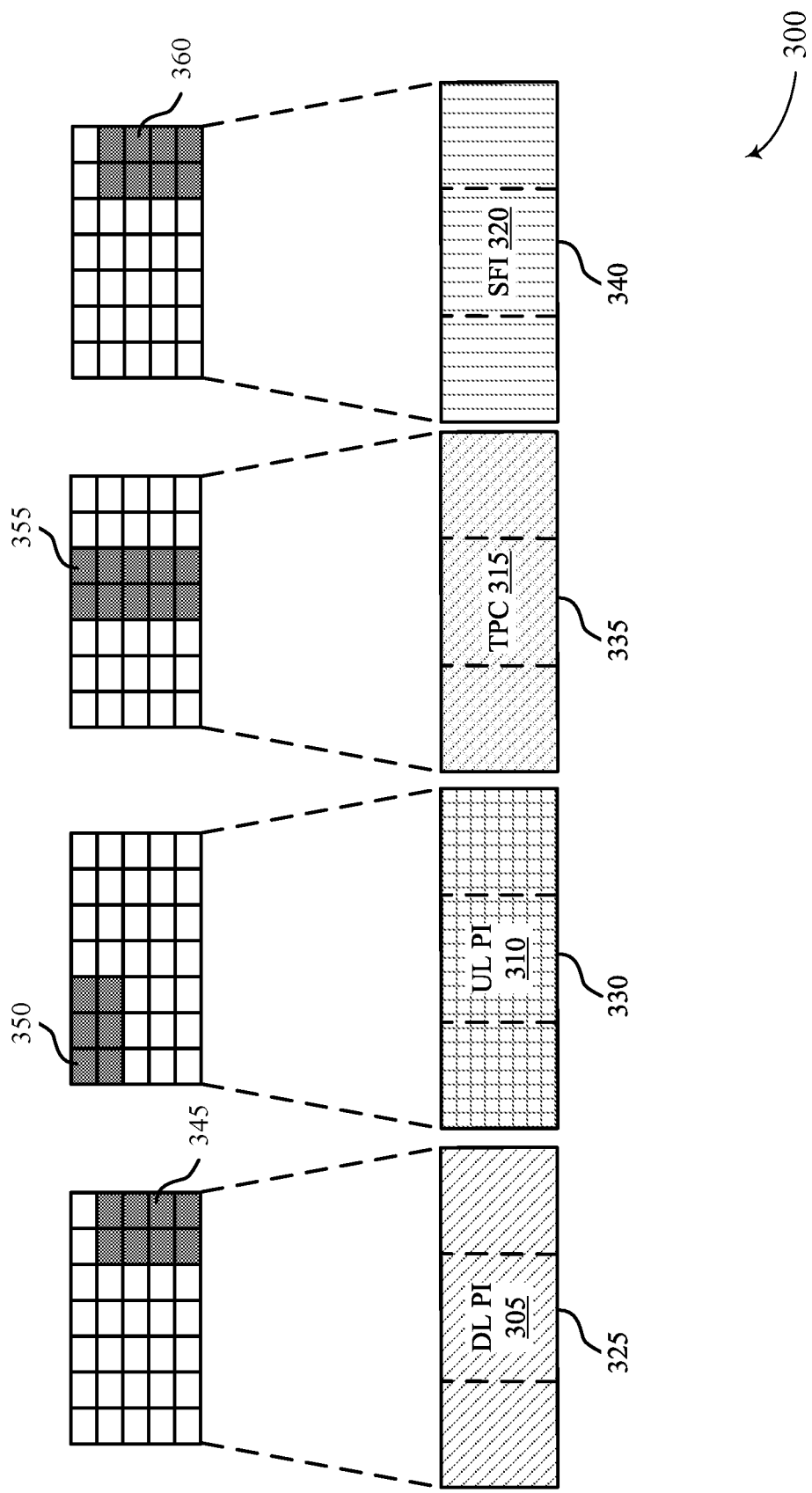
FIG. 3 illustrates an example of a group-common control information communication that supports group-common control information in accordance with aspects of the present disclosure.

FIG. 3 illustrates an example of a group-common control information communication 300 that supports group-common control information in accordance with aspects of the present disclosure. In some examples, group-common control information communication 300 may implement aspects of wireless communications systems 100 or 200. Group-common control information communication 300 may be an example of group-common DCI transmission 215-*a* or group-common DCI transmission 215-*b* as described with reference to FIG. 2. Further, group-common control information communication 300 may include a downlink PI field 305, an uplink PI field 310, a TPC field 315, or an SFI field 340, as shown. In some cases, one or more of the downlink PI field 305, the uplink PI field 310, the TPC field 315, or the SFI field 340 may be transmitted in one or more CORESETs (e.g., CORESETs 345, 350, 355, 360, or a combination thereof). Group-common control information communication 300 may be transmitted by one or more TRPs 105 and may be received by a UE 115.

Group-common control information communication 300 may contain a downlink PI field 305 for downlink PIs. Downlink PIs may indicate resources or spatial layers punctured by downlink transmissions from corresponding TRPs. For example, downlink PI field 305 of group-common control information communication 300 may correspond to all TRPs in a wireless communications system. The downlink PI may indicate that downlink communications puncture a set of OFDM symbols (e.g., OFDM symbol 1 and OFDM symbol 2). In some cases, the indicated OFDM symbols may be punctured by different TRPs. In an example of OFDM symbol 1 and OFDM symbol 2 being indicated as punctured, OFDM symbol 1 may be punctured by a first TRP, and OFDM symbol 2 may be punctured by a second, different TRP, and a UE may assume that all spatial layers of the punctured symbols are punctured.

In another example, downlink PI field 305 of group-common control information communication 300 may correspond to a subset of TRPs in a wireless communications system. For instance, the downlink PI field 305 may contain multiple subfields 325, where each subfield may indicate time-frequency resources punctured by communications from a TRP and in some cases, UE may determine one or more spatial layers carrying a downlink communication are punctured based on the downlink PIs. Some spatial layers, however, may remain unaffected from puncturing (e.g., if a downlink transmission is transmitted by multiple TRPs and over the same resources), and a UE may demodulate and decode the downlink transmission from unaffected spatial layers. In order for UE to demodulate and decode the downlink transmission, the UE may identify TRPs corresponding to the spatial streams for the downlink transmission. The identification may be accomplished based on Transmission Configuration Indicator (TCI) states or demodulation reference signal (DMRS) port group indices contained in downlink scheduling DCI.

In another example, downlink PI field 305 of group-common control information communication 300 may correspond to a single TRP. For example, downlink PI field 305 may correspond to the TRP that transmitted group-common control information communication 300. Downlink PI field 305 may be received in a CORESET (e.g., CORESET 345) corresponding to the transmitting TRP. If multiple downlink PIs are transmitted, the downlink PIs may have different periodicity, offset, etc. In some cases, such as in a dynamic TRP clustering setting, UE may monitor and decode downlink PI field 305 if it receives a downlink transmission (e.g., over a PDSCH) from the corresponding TRP within a given period of the downlink PI occasion. For example, if a UE receives two downlink scheduling DCIs in a slot, where each DCI triggers a downlink data transmission (e.g., over PDSCH), then UE may monitor two downlink PIs in the next downlink PI monitoring occasion. In another example, if UE 115 receives one downlink scheduling DCI, and all layers of a downlink data transmission (e.g., over PDSCH) are associated with the same DMRS port group and same TCI state, then UE 115 may monitor for one downlink PI from the TRP that transmitted the DCI.

Additionally or alternatively, group-common control information communication 300 may include an uplink PI field 310 for uplink PIs. Uplink PIs may indicate for a UE to refrain from transmitting a set of uplink transmissions on a set of time-frequency resources (e.g., a UE having multiple antenna panels may cancel an uplink transmission on a subset of panels, but may continue to transmit the uplink transmission on the remaining panels). If uplink PI field 310 of group-common control information communication 300 corresponds to all TRPs in a wireless communications system (e.g., group-common control information communication 300 contains one uplink PI field), UE may refrain from transmitting indicated uplink transmissions to all TRPs. If uplink PI field 310 of group-common control information communication 300 corresponds to a subset of TRPs (e.g., in multiple subfields 330), or to only one TRP, UE may refrain from transmitting an uplink transmission according to TRPs corresponding to uplink PI field 310 of group-common control communication 300. If a subset of TRPs contain multiple TRPs, UE 115 may identify corresponding TRPs by either a Quasi-Co-Location (QCL) condition (e.g., for an uplink control channel, sounding reference signals (SRS)), or by SRS resource indicators (SRIs) for an uplink channel (e.g., PUSCH). SRIs may be contained in an uplink scheduling grant, or may be contained in RRC signaling.

Additionally or alternatively, group-common control information communication 300 may include a TPC field 315 for TPC parameters. The TPC parameters may indicate power levels for uplink transmissions. If TPC field 315 of group-common control information communication 300 corresponds to all TRPs in a wireless communications system, UE may apply the TPC parameters to a power control loop indicated in group-common DCI. If TPC field 315 of group-common control communication 300 corresponds to a subset of TRPs (e.g., in subfields 335) or a single TRP, UE may apply TPC parameters to uplink transmissions targeted to the corresponding TRP(s) (e.g., power control is on a TRP basis).

Additionally or alternatively, group-common control information communication 300 may include an SFI field 320 for SFIs. SFIs may indicate a slot format configuration for a consecutive number of slots. A slot format may indicate whether an OFDM symbol of a given slot is an uplink communication symbol, a downlink communication symbol, or a flexible communication symbol. UE 115 may determine a slot structure for communications with corresponding TRP(s) according to the SFIs in group-common control information communication 300. If SFI field 320 corresponds to all TRPs in a wireless communications system, UE may determine a slot format configuration for communications with all TRPs in the wireless communications system. If SFI field 320 corresponds to a subset of TRPs (e.g., via subfields such as SFI field 340) or a single TRP, UE may determine a slot format configuration for communications with the subset of TRPs or the single TRP, respectively.

UE may perform a consistency check on an SFI received in group-common control information communication 300. Some communications systems (e.g., TDD systems) may provide slot format in multiple ways. Slot format configurations may be received in a semi-static, cell-specific assignment (e.g., via RRC signaling). Additionally or alternatively, slot format configurations may be received in a semi-static, UE-specific assignment (e.g., via configuration of different communication channels). Additionally or alternatively, slot format configurations may be received in a dynamic SFI from group-common DCI. Additionally or alternatively, slot format configurations may be determined implicitly based on the communication direction of a grant-based transmission (e.g., PDSCH, PUSCH, PUCCH, etc.). If slot format configurations are received in multiple ways, there may be inconsistencies present between the received slot formats configurations. To determine which slot format configuration applies, UE may perform a consistency check on the received slot format configurations.

Further, UE 115 may receive cell-specific and UE-specific resource configurations from different sources. In one example, UE 115 may receive a semi-static resource configuration (e.g., both cell-specific and UE-specific configurations) from each TRP separately. That is, each TRP may transmit separate semi-static resource configurations from one another. In this example, UE may determine that each received UE-specific configuration is consistent with the cell-specific configuration of the corresponding cell. In another example, UE may receive semi-static resource configurations for multiple TRPs from a single TRP (e.g., a joint UE-specific configuration for multiple TRPs, a joint cell-specific configuration for multiple TRPs, or both). The joint UE-specific configuration or joint cell-specific configuration received from a single TRP may specify configurations for communication with multiple TRPs. In some other cases, UE may receive a cell-specific configuration from a TRP, which may indicate a configuration for communication with multiple TRPs and a UE-specific configuration from each TRP separately. That is, UE 115 may receive a cell-specific configuration for multiple TRPs, and separate UE-specific configurations from each TRP. In this example, UE may determine that all UE-specific configurations received may be consistent with the received cell-specific configuration.

UE may receive one or multiple cell-specific configurations. If one cell-specific configuration is received, UE may associate a multi-TRP setting as a serving cell. Thus, any SFIs received may be consistent with the received cell-specific configuration. If multiple cell-specific configurations are received, UE associated a multi-TRP setting with multiple cells. If a single SFI is received, the SFI may be consistent with all cell-specific configurations. If multiple SFIs are received, each SFI may be consistent with a respective cell-specific configuration.

UE 115 may determine which slot format configuration applies based on group-common control information communication 300 and priorities assigned to the different methods of receiving the slot format configurations. UE may perform a consistency check on received slot format configurations, which may include SFIs received in SFI field 320. In an example, UE may receive separate UE-specific configurations and a joint dynamic SFI in group-common DCI (e.g., in group-common control information communication 300). In this example, UE may cancel semi-statically configured transmissions to all TRPs according to the UE-specific configurations on resources that have a contradicting communication direction between the joint SFI and the UE-specific configurations. For example, if the received joint SFI indicates a format configuration of a downlink or flexible OFDM symbol, then UE may cancel an uplink transmission (e.g., scheduled via semi-persistent scheduling (SPS)), which may be indicated in a UE-specific configuration, for the OFDM symbol, regardless of which TRPs the uplink transmission is sent.

In another example, UE may receive separate UE-specific configurations and separate dynamic SFI in group-common control information communication 300. In this example, each dynamic SFI may cancel a corresponding TRP's semi-statically configured transmissions separately. For example, if SFI corresponds to specific TRPs (e.g., a single TRP or a subset of TRPs), UE may determine that transmissions from associated TRPs are canceled on an individual basis. If some of the TRPs' format configuration indicated in SFI is consistent with a UE-specific configuration (e.g., downlink SPS), UE may determine that communications from TRPs will be transmitted according to the consistent configurations. If a TRP's format indicated in SFI is inconsistent with a UE-specific configuration, UE may assume that a downlink transmission from the TRP associated with the inconsistent UE-specific configuration is canceled. In this example, SFI may be used to control a multi-TRP downlink SPS to fall back to a single TRP downlink transmission or to cancel downlink transmissions completely in a dynamic fashion. As such, TRPs may utilize SFIs to dynamically notify the cancellation of semi-statically configured downlink transmissions to a UE.

In some cases, downlink transmissions from multiple TRPs may correspond to or may be communicated over different spatial layers. In such instances, an SFI that is inconsistent with a UE-specific configuration may cancel only the spatial layers of the UE-specific configuration that are inconsistent with the SFI. The spatial layers that are configured by a UE-specific configuration and that are consistent with the SFI may be transmitted to the UE.

In yet another example, UE 115 may receive a dynamic grant and SFI in group-common control information communication 300. In this example, determining which format configuration is prioritized may be based on corresponding TRPs in the received format configurations. UE may compare a TRP in the dynamic grant to the corresponding TRPs of the SFI received, and may determine to drop or cancel a communication based on this comparison. For example, UE may receive a joint SFI and a dynamic scheduling grant. UE may determine whether the communication direction (e.g., uplink, downlink, flexible) of the dynamic scheduling grant is consistent with the joint SFI. In another example, UE may receive separate SFIs and a dynamic grant. The dynamic grant may correspond to communications with at least one of the TRPs associated with the dynamic SFI. UE may determine that the communication direction for a given TRP indicated in the dynamic grant is consistent or inconsistent with the communication direction indicated in the SFI associated with the corresponding TRP. In such cases, UE may determine that a communication with a TRP (e.g., scheduled in a grant) is to be dropped or canceled based on a determined inconsistency.

Figure 4:
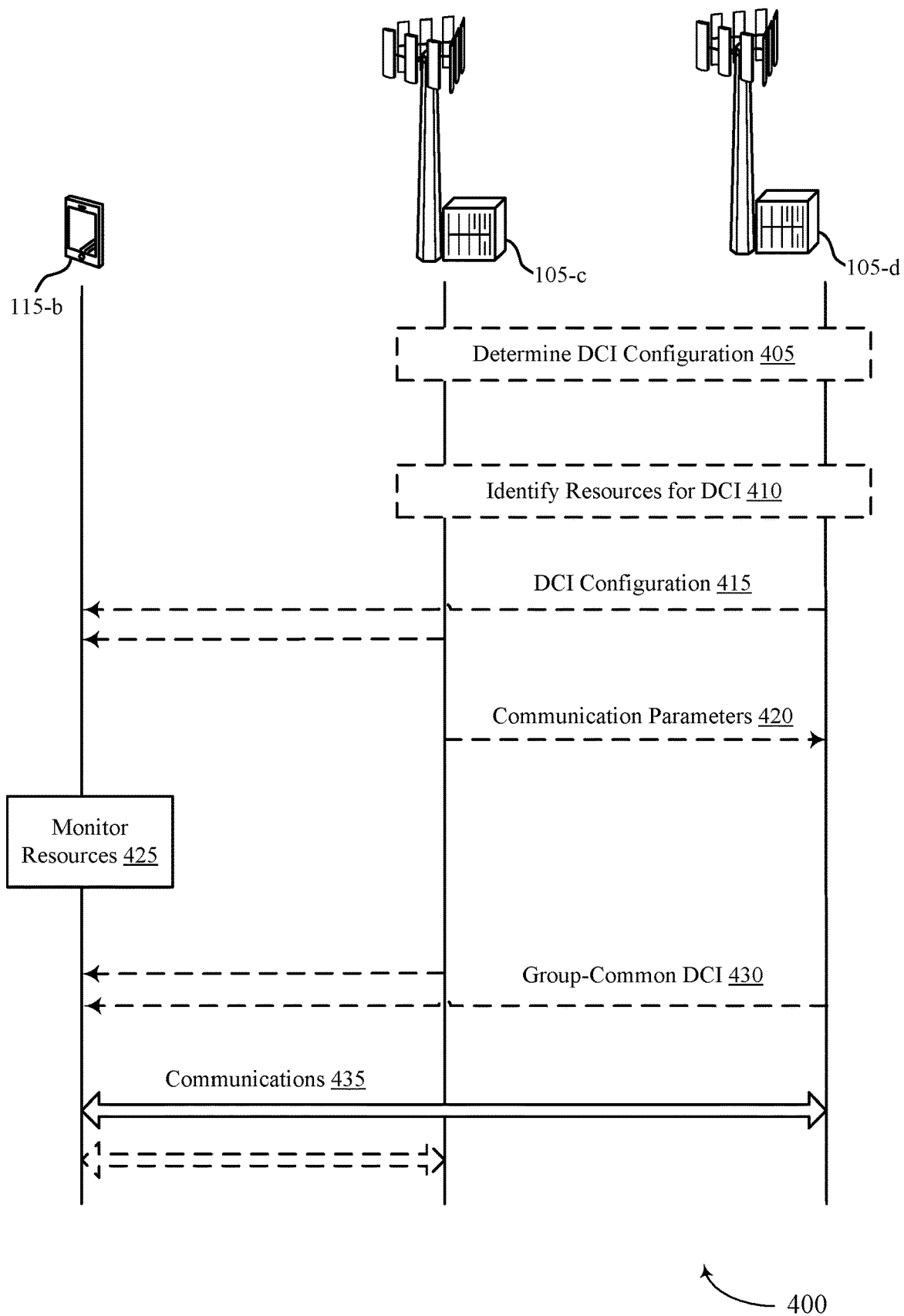
FIG. 4 illustrates an example of a process flow that supports group-common control information in accordance with aspects of the present disclosure.

FIG. 4 illustrates an example of a process flow 400 that supports group-common control information in accordance with aspects of the present disclosure. In some examples, process flow 400 may implement aspects of wireless communications systems 100 or 200 and may support communications according to group-common control information communication 300. Process flow 400 may include a TRP 105-*c*, TRP 105-*d*, and a UE 115*b*, which may be examples of the corresponding devices described herein.

At 405, TRP 105-*d* of a plurality of TRPs may determine a DCI configuration for transmission of group-common control information. Optionally, TRP 105-*c* may determine at least a portion of the DCI configuration. The group-common control information may be associated with the plurality of TRPs.

At 410, TRP 105-*d* may identify a set of downlink resources allocated for transmission of the group-common control information based at least in part on the configuration. Optionally, TRP 105-*c* may identify the set of downlink resources allocated for transmission of the group-common control information based at least in part on the configuration.

At 415, TRP 105-*d* may transmit, and UE 115-*b* may receive, a configuration for transmission of group-common control information associated with the plurality TRPs. Optionally, TRP 105-*c* may transmit the group-common configuration to UE 115-*b*. Optionally, at 420, TRP 105-*c* may transmit a subset of communication parameters to TRP 105-*d*.

At 425, UE 115-*b* may monitor a set of downlink resources allocated for the group-common control information based at least in part on the received configuration.

At 430, TRP 105-*d* may transmit, and UE 115-*b* may receive, the group-common control information via the set of downlink resources. Optionally, UE 115-*b* may receive the group-common control information from one or more of the plurality of TRPs (e.g., TRP 105-*c*). The group-common control information may indicate a set of communication parameters for communications between the UE 115-*b* and at least one TRP (e.g., TRP 105-*c* or TRP 105-*d*) of the plurality of TRPs. The group-common control information may include at least one of a downlink PI, an uplink PI, a SFI, a TPC, or a combination thereof.

At 435, UE 115-*b* may communicate with TRP 105-*d* based on the received group-common control information. Optionally, UE 115-*b* may communicate with TRP 105-*c* based on the received group-common control information. If the group-common control channel includes a downlink PI, UE 115-*b* may decode or demodulate a downlink transmission based on punctured resources or spatial layers indicated in the downlink PI. The punctured resources or spatial layers may be punctured by transmissions from TRP 105-*c*, TRP 105-*d*, or both. If the group-common control channel includes an uplink PI, UE 115-*b* may refrain from transmitting an uplink communication to TRP 105-*c*, TRP 105-*d*, or both. If the group-common control channel includes a TPC, UE 115-*b* may determine power levels for a set of uplink transmissions based on the TPC. The set of uplink transmissions may be to TRP 105-*c*, TRP 105-*d*, or both. If the group-common control channel includes an SFI, UE 115-*b* may determine a slot configuration for communications with TRP 105-*c*, TRP 105-*d*, or both, based on the SFI.

Figure 5:
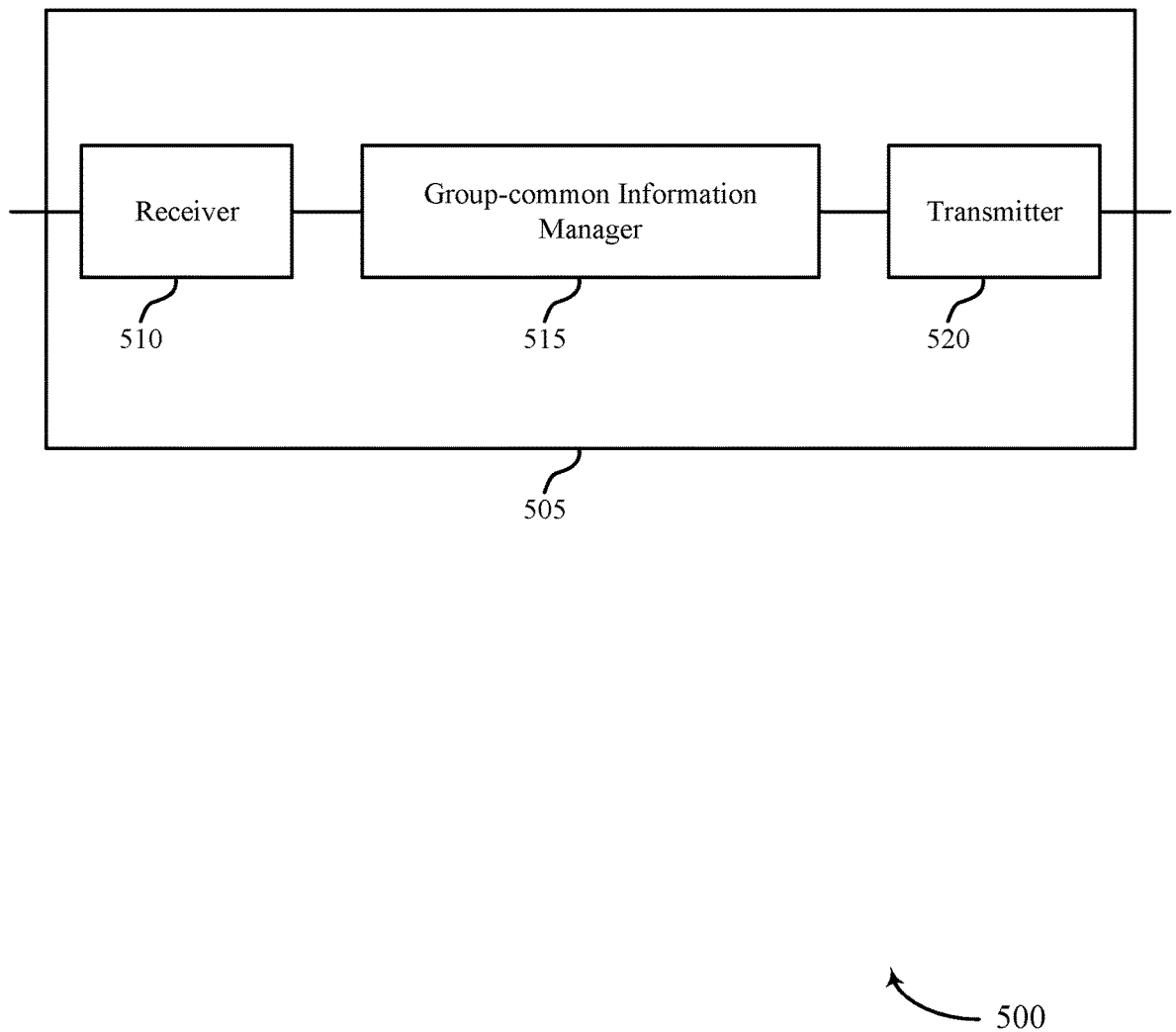
FIGS. 5 and 6 show block diagrams of devices that support group-common control information in accordance with aspects of the present disclosure.

FIG. 5 shows a block diagram 500 of a device 505 that supports group-common control information in accordance with aspects of the present disclosure. The device 505 may be an example of aspects of a UE 115 as described herein. The device 505 may include a receiver 510, a group-common information manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to group-common control information, etc.). Information may be passed on to other components of the device 505. The receiver 510 may be an example of aspects of the transceiver 820 described with reference to FIG. 8. The receiver 510 may utilize a single antenna or a set of antennas.

The group-common information manager 515 may receive, from a first TRP of a set of TRPs, a configuration for downlink transmission of group-common control information associated with the set of TRPs, monitor a set of downlink resources allocated for the group-common control information based on the received configuration, and receive, based on the monitoring, the group-common control information from one or more of the set of TRPs via the set of downlink resources, where the group-common control information indicates a set of communication parameters for communications between the UE and at least one TRP of the set of TRPs. The group-common information manager 515 may be an example of aspects of the group-common information manager 810 described herein.

The group-common information manager 515, or its sub-components, may be implemented in hardware, code (e.g., software or firmware) executed by a processor, or any combination thereof. If implemented in code executed by a processor, the functions of the group-common information manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The group-common information manager 515, or its sub-components, may be physically located at various positions, including being distributed such that portions of functions are implemented at different physical locations by one or more physical components. In some examples, the group-common information manager 515, or its sub-components, may be a separate and distinct component in accordance with various aspects of the present disclosure. In some examples, the group-common information manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the group-common information manager 515 as described herein may be implemented to realize one or more potential advantages. One implementation may enable a wireless device, such as a UE, to utilize coordinated communications with one or more TRPs, which may result in more efficient resource utilization, less overhead, and reduce the chance of communication of conflicting information in a wireless communications system.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
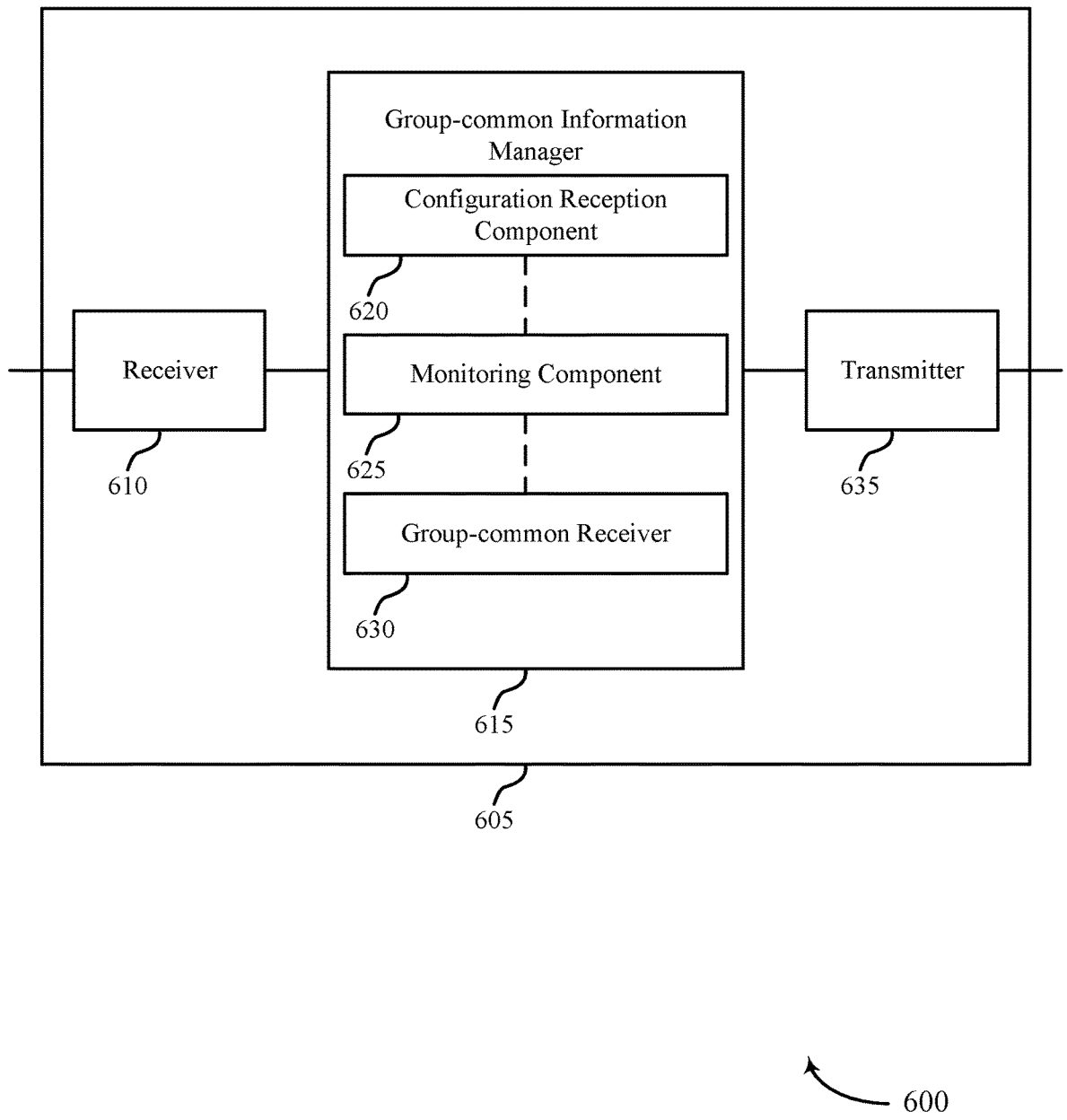

FIG. 6 shows a block diagram 600 of a device 605 that supports group-common control information in accordance with aspects of the present disclosure. The device 605 may be an example of aspects of a device 505 or a UE 115 as described herein. The device 605 may include a receiver 610, a group-common information manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to group-common control information, etc.). Information may be passed on to other components of the device 605. The receiver 610 may be an example of aspects of the transceiver 820 described with reference to FIG. 8. The receiver 610 may utilize a single antenna or a set of antennas.

The group-common information manager 615 may be an example of aspects of the group-common information manager 515 as described herein. The group-common information manager 615 may include a configuration reception component 620, a monitoring component 625, and a group-common receiver 630. The group-common information manager 615 may be an example of aspects of the group-common information manager 810 described herein.

The configuration reception component 620 may receive, from a first TRP of a set of TRPs, a configuration for downlink transmission of group-common control information associated with the set of TRPs.

The monitoring component 625 may monitor a set of downlink resources allocated for the group-common control information based on the received configuration.

The group-common receiver 630 may receive, based on the monitoring, the group-common control information from one or more of the set of TRPs via the set of downlink resources, where the group-common control information indicates a set of communication parameters for communications between the UE and at least one TRP of the set of TRPs.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
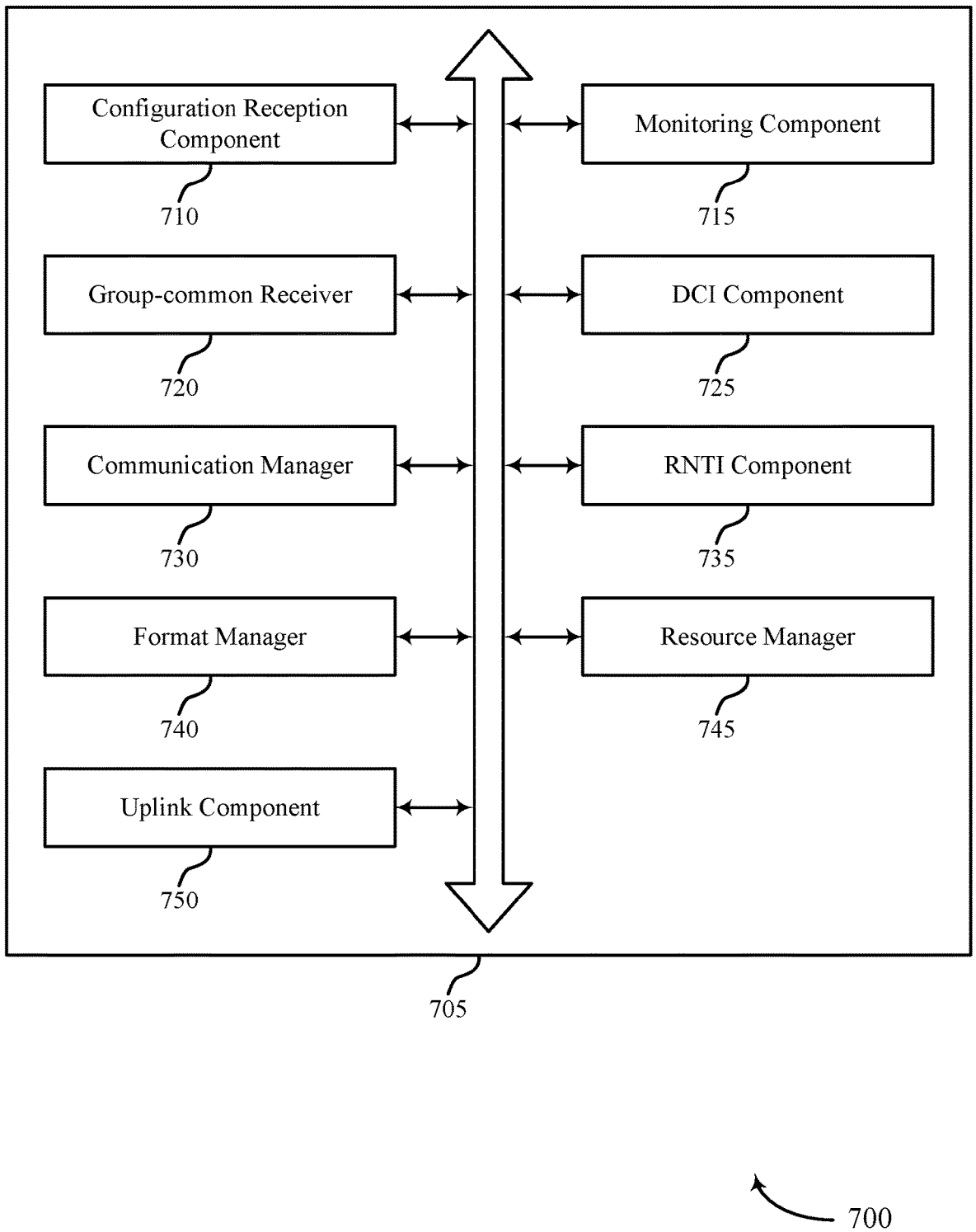
FIG. 7 shows a block diagram of a group-common information manager that supports group-common control information in accordance with aspects of the present disclosure.

FIG. 7 shows a block diagram 700 of a group-common information manager 705 that supports group-common control information in accordance with aspects of the present disclosure. The group-common information manager 705 may be an example of aspects of a group-common information manager 515, a group-common information manager 615, or a group-common information manager 810 described herein. The group-common information manager 705 may include a configuration reception component 710, a monitoring component 715, a group-common receiver 720, a DCI component 725, a communication manager 730, a RNTI component 735, a format manager 740, a resource manager 745, and an uplink component 750. Each of these modules may communicate, directly or indirectly, with one another (e.g., via one or more buses).

The configuration reception component 710 may receive, from a first TRP of a set of TRPs, a configuration for downlink transmission of group-common control information associated with the set of TRPs.

In some examples, the configuration reception component 710 may receive the configuration via an RRC channel, where the configuration indicates a PI monitoring configuration.

The monitoring component 715 may monitor a set of downlink resources allocated for the group-common control information based on the received configuration.

In some examples, the monitoring component 715 may monitor the set of downlink resources based on the PI monitoring configuration.

In some examples, the monitoring component 715 may monitor the set of downlink resources based on a control information field indicated by the configuration.

The group-common receiver 720 may receive, based on the monitoring, the group-common control information from one or more of the set of TRPs via the set of downlink resources, where the group-common control information indicates a set of communication parameters for communications between the UE and at least one TRP of the set of TRPs.

In some examples, the group-common receiver 720 may receive joint group-common DCI associated with communications between the UE and all TRPs of the set of TRPs.

In some examples, the group-common receiver 720 may receive joint group-common DCI including a set of fields associated with communications between the UE and the set of TRPs, where each field indicates communication parameters for communications between the UE and a respective TRP of the set of TRPs.

In some examples, the group-common receiver 720 may receive group-common DCI from a TRP over a CORESET, where the CORESET is indicative of the TRP.

In some examples, the group-common receiver 720 may receive multiple group-common DCI messages, where the each group-common DCI message indicates communication parameters for communications between the UE and a respective TRP of the set of TRPs. In some examples, each group-common DCI message has a same bit size. An advantage of receiving communication parameters for communications between the UE and a respective TRP may include enabling a device (e.g., a UE 115) to effectively communicate with one or more TRPs in a multi-TRP environment, which may result in reduced overhead and a reduced chance of miscommunications in a wireless communications system, among other advantages.

In some cases, each group-common DCI message has a same bit size. In some cases, the group-common control information includes at least one of a downlink PI, an uplink PI, an SFI, a TPC, or any combination thereof.

In some cases, the group-common control information includes a downlink PI.

In some cases, the downlink PI indicates a union of time-frequency resources punctured by transmissions from each of the set of TRPs.

In some cases, the group-common control information includes a set of downlink PIs, each downlink PI associated with a respective TRP of the set of TRPs and indicates resources preempted by the respective TRP.

In some cases, the group-common control information includes an uplink PI.

In some cases, the group-common control information includes a set of uplink PIs, each uplink PI may be associated with uplink transmissions to a respective TRP of the set of TRPs and indicates resources preempted for the uplink transmissions to the respective TRP.

In some cases, the group-common control information includes an SFI for the UE.

In some cases, the group-common control information includes a TPC command for communications between the UE and the at least one TRP.

In some cases, the group-common control information includes a set of TPC commands, each TPC command associated with communications between the UE and a respective TRP of the set of TRPs.

The DCI component 725 may receive a first group-common DCI message from the first TRP over a first CORESET.

In some examples, the DCI component 725 may receive a second group-common DCI message from a second TRP over a second CORESET.

The communication manager 730 may determine communication parameters for the first TRP based on an ID associated with the first CORESET and communication parameters for the second TRP based on an ID associated with the second CORESET.

In some examples, the communication manager 730 may determine communication parameters for the first TRP based on a first RNTI of the set of RNTIs.

In some examples, the communication manager 730 may determine communication parameters for a second TRP based on a second RNTI of the set of RNTIs.

In some examples, the communication manager 730 may determine the set of communication parameters for communications between the UE and the at least one TRP of the set of TRPs based on the format of the group-common control information.

In some examples, the communication manager 730 may communicate over at least the portion of time-frequency resources according to the prioritized first resource configuration.

In some examples, the communication manager 730 may cancel semi-statically configured communications between the UE and the set of TRPs on resources that have a contradicting communication direction between the SFI and the UE-specific resource configurations.

In some examples, the communication manager 730 may cancel semi-statically configured communications between the UE and each respective TRP on resources that have a contradicting communication direction between the each SFI of the set of SFIs and the UE-specific resource configuration from the respective TRP.

In some examples, the communication manager 730 may cancel semi-static configured communications between the UE and the set of TRPs on resources that have a contradicting communication direction between the SFI and the UE-specific semi-static resource configuration.

In some examples, the communication manager 730 may cancel communications between the UE and each respective TRP on resources that have a contradicting communication direction between the SFI and the cell-specific resource configuration.

The RNTI component 735 may identify a set of RNTIs configured for the UE, each RNTI associated with communications between the UE and a respective TRP of the set of TRPs.

The format manager 740 may identify a format of the group-common control information based on the configuration.

The resource manager 745 may determine a set of time-frequency resources punctured by transmissions from a TRP of the set of TRPs based on the downlink PI.

In some examples, the resource manager 745 may determine a set of spatial layers punctured by transmissions from a TRP of the set of TRPs based on the downlink PI.

In some examples, the resource manager 745 may determine a set of time-frequency resources associated with a transmission from a second UE.

In some examples, the resource manager 745 may receive a grant for communications with a second TRP of the plurality of TRPs, where the grant may indicate at least one communication direction for communication between the UE and the second TRP. In some examples, the resource manager 745 may determine a consistency between the grant and the SFI. In some examples, the resource manager 745 may communicate with the second TRP based on determining the consistency.

In some examples, the resource manager 745 may receive a second group-common control message. In some cases, the second group-common control message includes a second SFI corresponding to a second TRP. In some examples, the resource manager 745 may receive a grant for communications with a subset of TRPs. In some cases, the grant indicates at least one communication direction for communication between the UE and the second TRP. In some examples, the resource manager 745 may determine a consistency between the grant and the second SFI. In some examples, the resource manager 745 may communicate with the second TRP based at least in part on determining the consistency.

In some examples, the resource manager 745 may receive a cell-specific semi-static resource configuration and a UE-specific semi-static resource configuration for the UE.

In some examples, the resource manager 745 may determine a set of resource configurations based on the SFI, the cell-specific semi-static resource configuration, and the UE-specific semi-static resource configuration.

In some examples, the resource manager 745 may prioritize a first resource configuration of the set of resource configurations over a second resource configuration of the set of resource configurations for at least a portion of time-frequency resources associated with the set of resource configurations.

In some examples, the resource manager 745 may receive respective cell-specific resource configurations and UE-specific resource configurations from each TRP of the set of TRPs. In some cases, each cell-specific resource configuration and UE-specific resource configuration indicates a communication direction for communications between the UE and a subset of TRPs of the set of TRPs.

In some examples, the resource manager 745 may receive a joint SFI that indicates a slot format for communications between the UE and the set of TRPs, where the joint SFI is consistent with all cell-specific resource configurations.

In some examples, the resource manager 745 may receive a set of SFIs, each SFI corresponding to a respective TRP of the set of TRPs and indicates a slot format for communications between the UE and the respective TRP, and each SFI may be consistent with the cell-specific resource configuration from the respective TRP of the set of TRPs.

In some examples, the resource manager 745 may receive a joint SFI that indicates a slot format for communications between the UE and the set of TRPs.

In some examples, the resource manager 745 may receive a set of SFIs, each SFI corresponding to a respective TRP of the set of TRPs and indicates a slot format for communications between the UE and the respective TRP.

In some examples, the resource manager 745 may receive the cell-specific resource configuration for multiple TRPs from only one TRP of the set of TRPs.

In some examples, the resource manager 745 may receive the UE-specific resource configuration for multiple TRPs from only one TRP of the set of TRPs.

In some examples, the resource manager 745 may receive the cell-specific resource configuration for multiple TRPs from only one TRP of the set of TRPs.

In some examples, the resource manager 745 may receive multiple UE-specific resource configurations from respective TRPs of the set of TRPs.

In some examples, the resource manager 745 may determine an inconsistency between the first resource configuration and the second resource configuration, where the prioritizing is based on the inconsistency.

In some examples, the resource manages 745 may receive the UE-specific semi-static resource configuration for multiple TRPs from only one TRP of the set of TRPs.

In some cases, at least one of the cell-specific semi-static resource configuration or the UE-specific semi-static resource configuration identifies a communication direction for resources allocated for communication between the UE and a subset of TRPs of the set of TRPs.

In some cases, the communication direction includes one of downlink, uplink, or flexible.

The uplink component 750 may refrain from transmitting an uplink transmission from the UE over the set of time-frequency resources based on the uplink PI. In some cases, the UE withholds uplink transmissions to all TRPs over the set of time-frequency resources.

In some cases, the UE withholds uplink transmissions to each respective TRP based on the set of uplink PIs.

Figure 8:
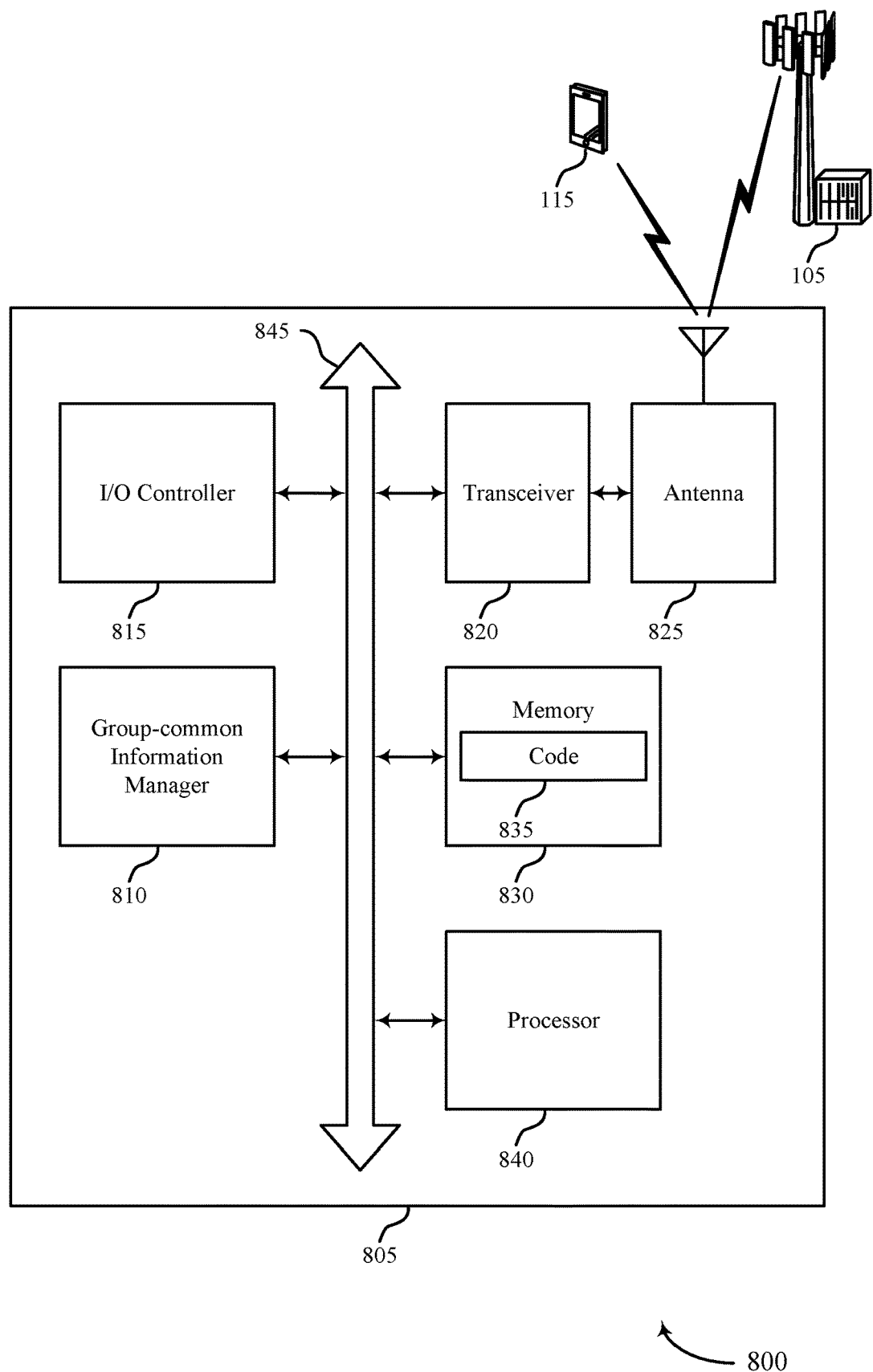
FIG. 8 shows a diagram of a system including a device that supports group-common control information in accordance with aspects of the present disclosure.

FIG. 8 shows a diagram of a system 800 including a device 805 that supports group-common control information in accordance with aspects of the present disclosure. The device 805 may be an example of or include the components of device 505, device 605, or a UE 115 as described herein. The device 805 may include components for bi-directional voice and data communications including components for transmitting and receiving communications, including a group-common information manager 810, an I/O controller 815, a transceiver 820, an antenna 825, memory 830, and a processor 840. These components may be in electronic communication via one or more buses (e.g., bus 845).

The group-common information manager 810 may receive, from a first TRP of a set of TRPs, a configuration for downlink transmission of group-common control information associated with the set of TRPs, monitor a set of downlink resources allocated for the group-common control information based on the received configuration, and receive, based on the monitoring, the group-common control information from one or more of the set of TRPs via the set of downlink resources, where the group-common control information indicates a set of communication parameters for communications between the UE and at least one TRP of the set of TRPs.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting group-common control information).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
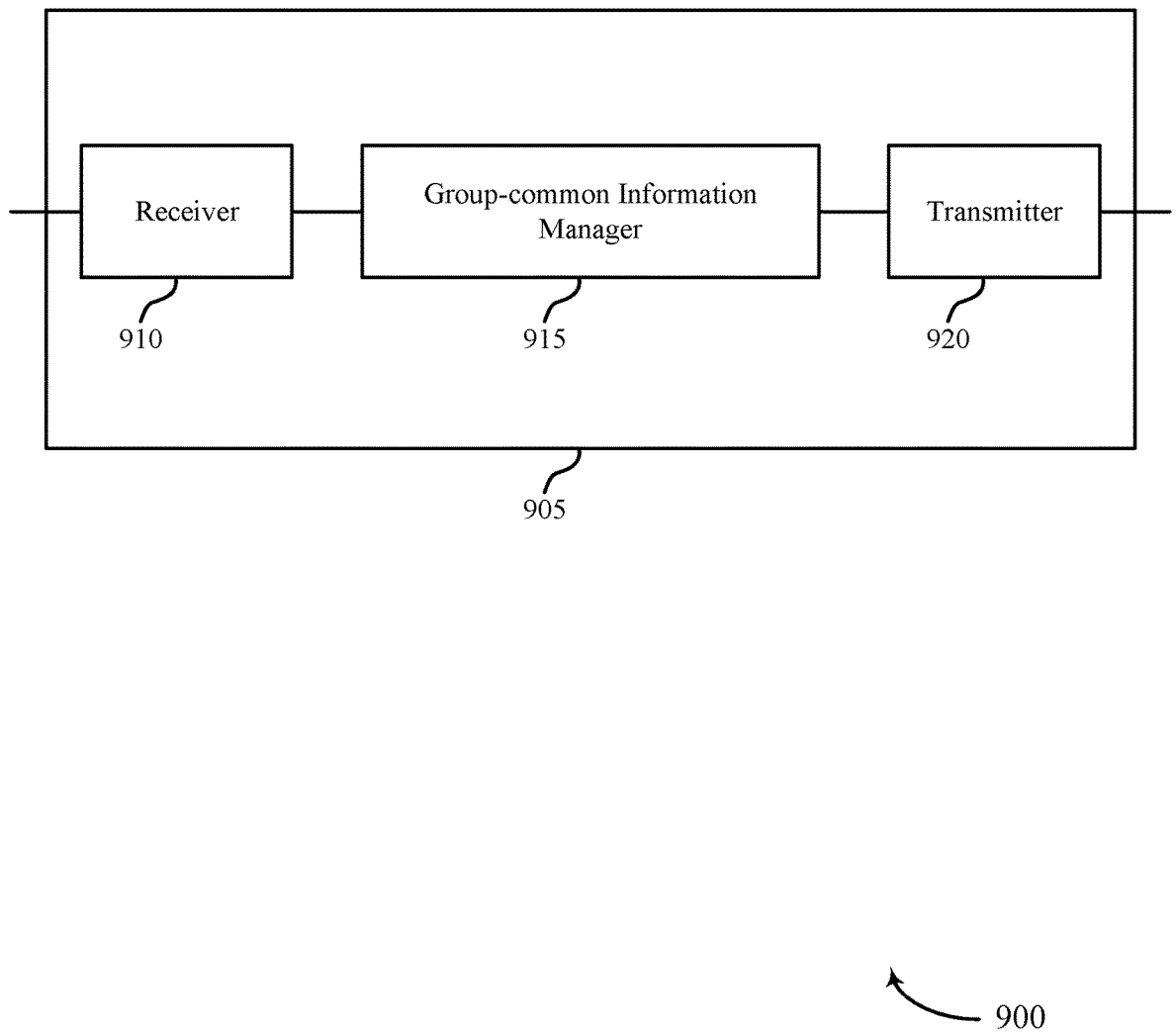
FIGS. 9 and 10 show block diagrams of devices that support group-common control information in accordance with aspects of the present disclosure.

FIG. 9 shows a block diagram 900 of a device 905 that supports group-common control information in accordance with aspects of the present disclosure. The device 905 may be an example of aspects of a TRP 105 as described herein. The device 905 may include a receiver 910, a group-common information manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to group-common control information, etc.). Information may be passed on to other components of the device 905. The receiver 910 may be an example of aspects of the transceiver 1220 described with reference to FIG. 12. The receiver 910 may utilize a single antenna or a set of antennas.

The group-common information manager 915 may determine a configuration for downlink transmission of group-common control information associated with the set of TRPs, identify a set of downlink resources allocated for transmission of the group-common control information based on the configuration, and transmit the group-common control information to a UE via the set of downlink resources, where the group-common control information indicates a set of communication parameters for communications between the UE and at least one TRP of the set of TRPs. The group-common information manager 915 may be an example of aspects of the group-common information manager 1210 described herein.

The group-common information manager 915, or its sub-components, may be implemented in hardware, code (e.g., software or firmware) executed by a processor, or any combination thereof. If implemented in code executed by a processor, the functions of the group-common information manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The group-common information manager 915, or its sub-components, may be physically located at various positions, including being distributed such that portions of functions are implemented at different physical locations by one or more physical components. In some examples, the group-common information manager 915, or its sub-components, may be a separate and distinct component in accordance with various aspects of the present disclosure. In some examples, the group-common information manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
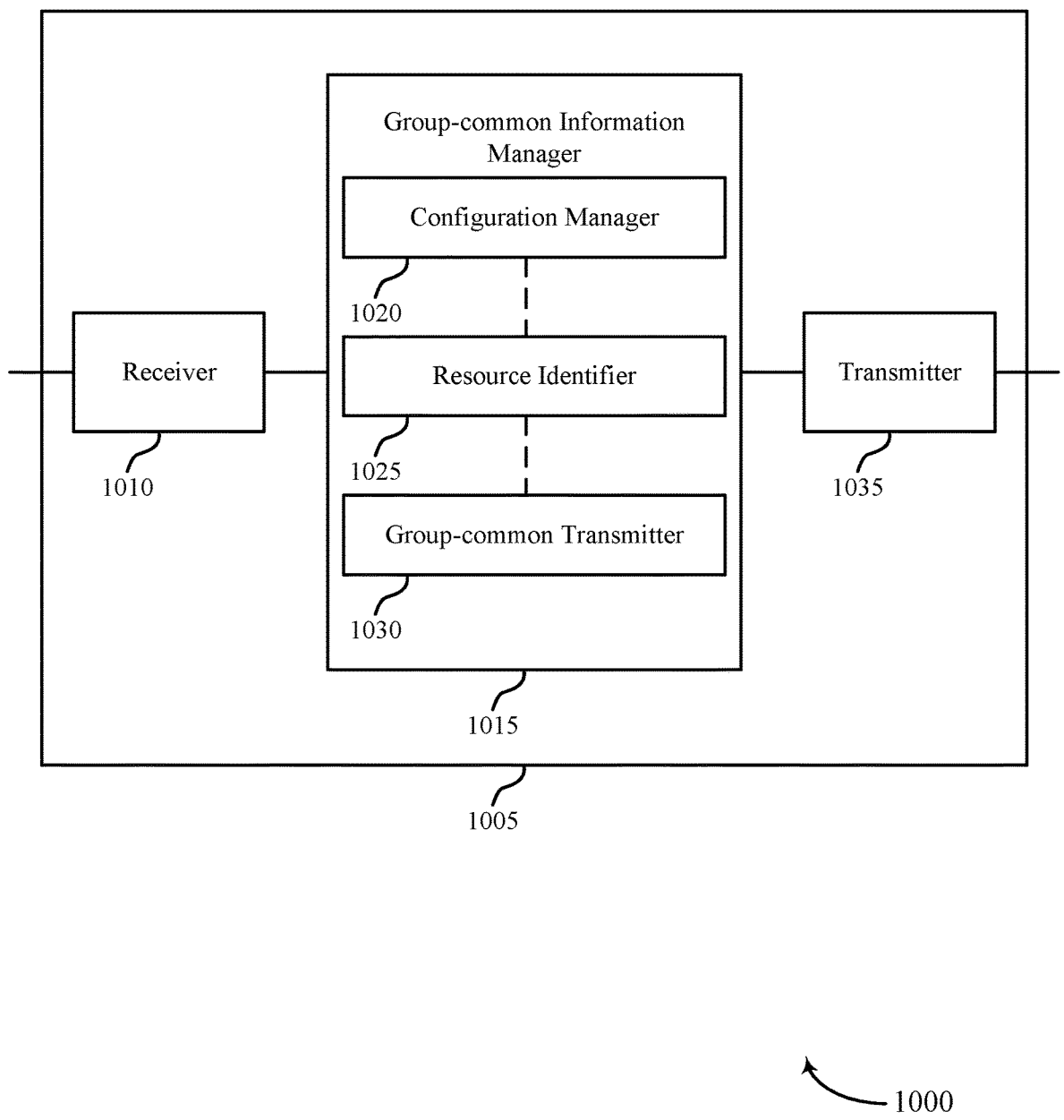

FIG. 10 shows a block diagram 1000 of a device 1005 that supports group-common control information in accordance with aspects of the present disclosure. The device 1005 may be an example of aspects of a device 905 or a TRP 105 as described herein. The device 1005 may include a receiver 1010, a group-common information manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to group-common control information, etc.). Information may be passed on to other components of the device 1005. The receiver 1010 may be an example of aspects of the transceiver 1220 described with reference to FIG. 12. The receiver 1010 may utilize a single antenna or a set of antennas.

The group-common information manager 1015 may be an example of aspects of the group-common information manager 915 as described herein. The group-common information manager 1015 may include a configuration manager 1020, a resource identifier 1025, and a group-common transmitter 1030. The group-common information manager 1015 may be an example of aspects of the group-common information manager 1210 described herein.

The configuration manager 1020 may determine a configuration for downlink transmission of group-common control information associated with the set of TRPs.

The resource identifier 1025 may identify a set of downlink resources allocated for transmission of the group-common control information based on the configuration.

The group-common transmitter 1030 may transmit the group-common control information to a UE via the set of downlink resources, where the group-common control information indicates a set of communication parameters for communications between the UE and at least one TRP of the set of TRPs.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
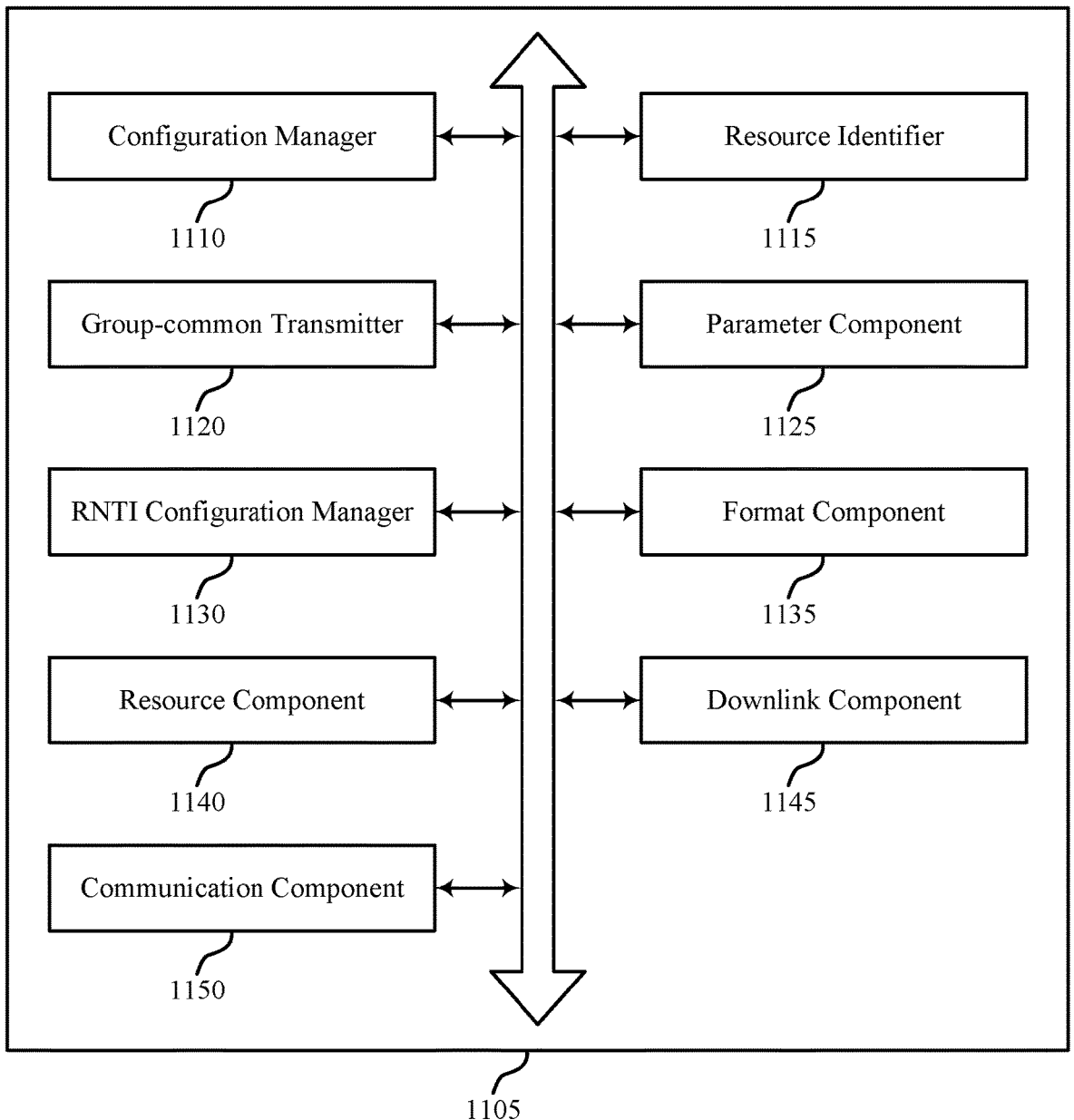
FIG. 11 shows a block diagram of a group-common information manager that supports group-common control information in accordance with aspects of the present disclosure.

FIG. 11 shows a block diagram 1100 of a group-common information manager 1105 that supports group-common control information in accordance with aspects of the present disclosure. The group-common information manager 1105 may be an example of aspects of a group-common information manager 915, a group-common information manager 1015, or a group-common information manager 1210 described herein. The group-common information manager 1105 may include a configuration manager 1110, a resource identifier 1115, a group-common transmitter 1120, a parameter component 1125, a RNTI configuration manager 1130, a format component 1135, a resource component 1140, a downlink component 1145, and a communication component 1150. Each of these modules may communicate, directly or indirectly, with one another (e.g., via one or more buses).

The configuration manager 1110 may determine a configuration for downlink transmission of group-common control information associated with the set of TRPs.

In some examples, transmitting an indication of the configuration to the UE, where the indication is transmitted via an RRC channel and includes a PI configuration.

The resource identifier 1115 may identify a set of downlink resources allocated for transmission of the group-common control information based on the configuration.

The group-common transmitter 1120 may transmit the group-common control information to a UE via the set of downlink resources, where the group-common control information indicates a set of communication parameters for communications between the UE and at least one TRP of the set of TRPs.

In some examples, the group-common transmitter 1120 may transmit joint group-common DCI associated with communications between the UE and all TRPs of the set of TRPs.

In some examples, the group-common transmitter 1120 may transmit joint group-common DCI including a set of fields associated with communications between the UE and the set of TRPs, where each field indicates communication parameters for communications between the UE and a respective TRP of the set of TRPs.

In some examples, the group-common transmitter 1120 may transmit a group-common DCI message that indicates communication parameters for communications between the UE and the first TRP.

In some cases, the group-common control information includes a downlink PI.

In some cases, the group-common control information includes a set of downlink PIs, each downlink PI associated with a respective TRP of the set of TRPs and indicates resources preempted by the respective TRP.

In some cases, the group-common control information includes an uplink PI.

In some cases, the group-common control information includes an SFI for the UE.

In some cases, the group-common control information includes a TPC command for communications between the UE and the at least one TRP.

In some cases, the group-common control information includes a set of TPC commands, each TPC command associated with communications between the UE and a respective TRP of the set of TRPs.

The parameter component 1125 may receive, from one or more TRPs of the set of TRPs, a subset of the communication parameters for communications between the UE and the one or more TRPs, where the group-common control information indicates the subset of the communication parameters.

The RNTI configuration manager 1130 may configure the UE with a RNTI for communications between the UE and the first TRP.

In some examples, the RNTI configuration manager 1130 may configure the UE with a set of RNTIs, each RNTI associated with communications between the UE and a respective TRP of the set of TRPs.

The format component 1135 may identify a format for the group-common control information, where the set of communication parameters is based on the format.

The resource component 1140 may determine a set of time-frequency resources punctured by transmissions from a TRP of the set of TRPs based on the downlink PI.

In some examples, the resource component 1140 may determine a set of spatial layers punctured by transmissions from a TRP of the set of TRPs based on the downlink PI.

In some examples, the resource component 1140 may determine a set of uplink resources associated with a transmission from a second UE based on the uplink PI.

In some examples, the resource component 1140 may refrain from monitoring the set of uplink resources for an uplink transmission from the UE over the set of time-frequency resources.

In some examples, the resource component 1140 may transmit a cell-specific semi-static resource configuration to the UE.

In some examples, the resource component 1140 may transmit a UE-specific semi-static resource configuration to the UE.

In some cases, the cell-specific semi-static resource configuration is associated with multiple TRPs of the set of TRPs.

The downlink component 1145 may withhold a downlink transmission to the UE over the set of time-frequency resources.

In some examples, the downlink component 1145 may withhold a downlink transmission to the UE over the set of spatial layers.

The communication component 1150 may communicate with the UE according to the cell-specific semi-static resource configuration.

In some examples, the communication component 1150 may communicate with the UE according to the UE-specific semi-static resource configuration.

Figure 12:
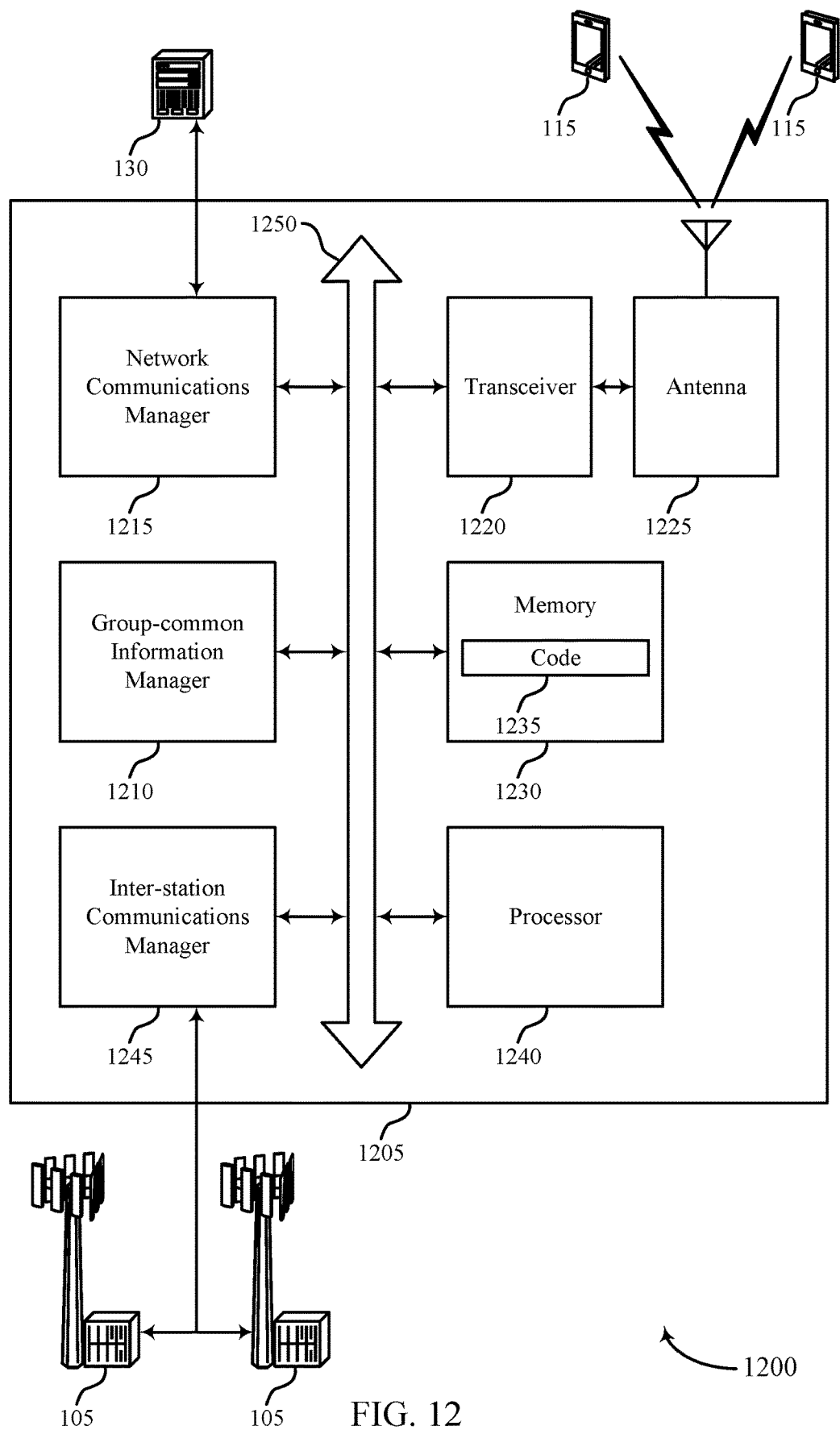
FIG. 12 shows a diagram of a system including a device that supports group-common control information in accordance with aspects of the present disclosure.

FIG. 12 shows a diagram of a system 1200 including a device 1205 that supports group-common control information in accordance with aspects of the present disclosure. The device 1205 may be an example of or include the components of device 905, device 1005, or a TRP 105 as described herein. The device 1205 may include components for bi-directional voice and data communications including components for transmitting and receiving communications, including a group-common information manager 1210, a network communications manager 1215, a transceiver 1220, an antenna 1225, memory 1230, a processor 1240, and an inter-station communications manager 1245. These components may be in electronic communication via one or more buses (e.g., bus 1250).

The group-common information manager 1210 may determine a configuration for downlink transmission of group-common control information associated with the set of TRPs, identify a set of downlink resources allocated for transmission of the group-common control information based on the configuration, and transmit the group-common control information to a UE via the set of downlink resources, where the group-common control information indicates a set of communication parameters for communications between the UE and at least one TRP of the set of TRPs.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting group-common control information).

The inter-station communications manager 1245 may manage communications with other TRP 105, and may include a controller or scheduler for controlling communications with UEs 115 in cooperation with other TRPs 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between TRPs 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
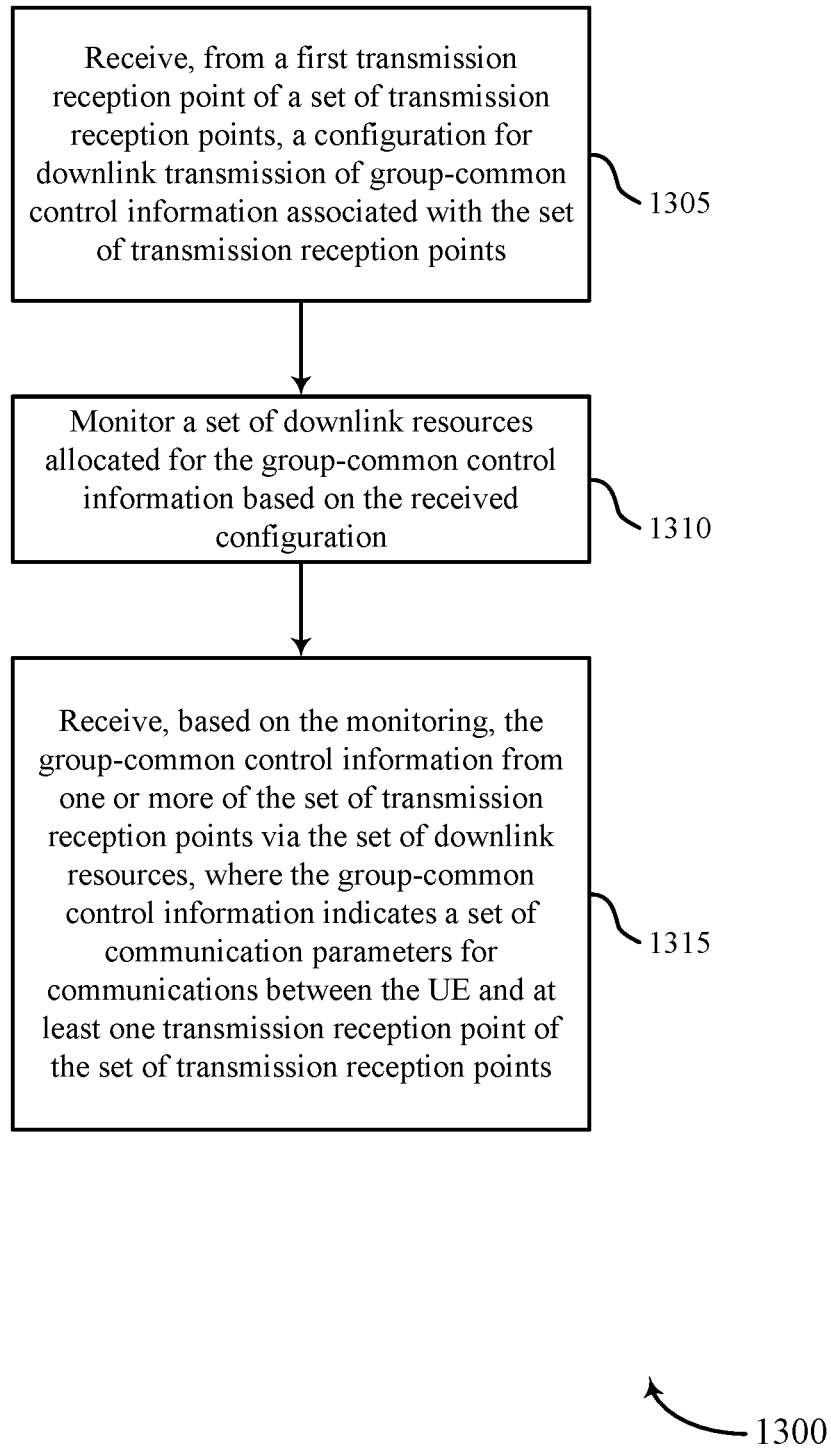
FIGS. 13 through 20 show flowcharts illustrating methods that support group-common control information in accordance with aspects of the present disclosure.

FIG. 13 shows a flowchart illustrating a method 1300 that supports group-common control information in accordance with aspects of the present disclosure. The operations of method 1300 may be implemented by a UE 115 or its components as described herein. For example, the operations of method 1300 may be performed by a group-common information manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a first TRP of a set of TRPs, a configuration for downlink transmission of group-common control information associated with the set of TRPs. The operations of 1305 may be performed according to the methods described herein. In some examples, aspects of the operations of 1305 may be performed by a configuration reception component as described with reference to FIGS. 5 through 8.

At 1310, the UE may monitor a set of downlink resources allocated for the group-common control information based on the received configuration. The operations of 1310 may be performed according to the methods described herein. In some examples, aspects of the operations of 1310 may be performed by a monitoring component as described with reference to FIGS. 5 through 8.

At 1315, the UE may receive, based on the monitoring, the group-common control information from one or more of the set of TRPs via the set of downlink resources, where the group-common control information indicates a set of communication parameters for communications between the UE and at least one TRP of the set of TRPs. The operations of 1315 may be performed according to the methods described herein. In some examples, aspects of the operations of 1315 may be performed by a group-common receiver as described with reference to FIGS. 5 through 8.

Figure 14:
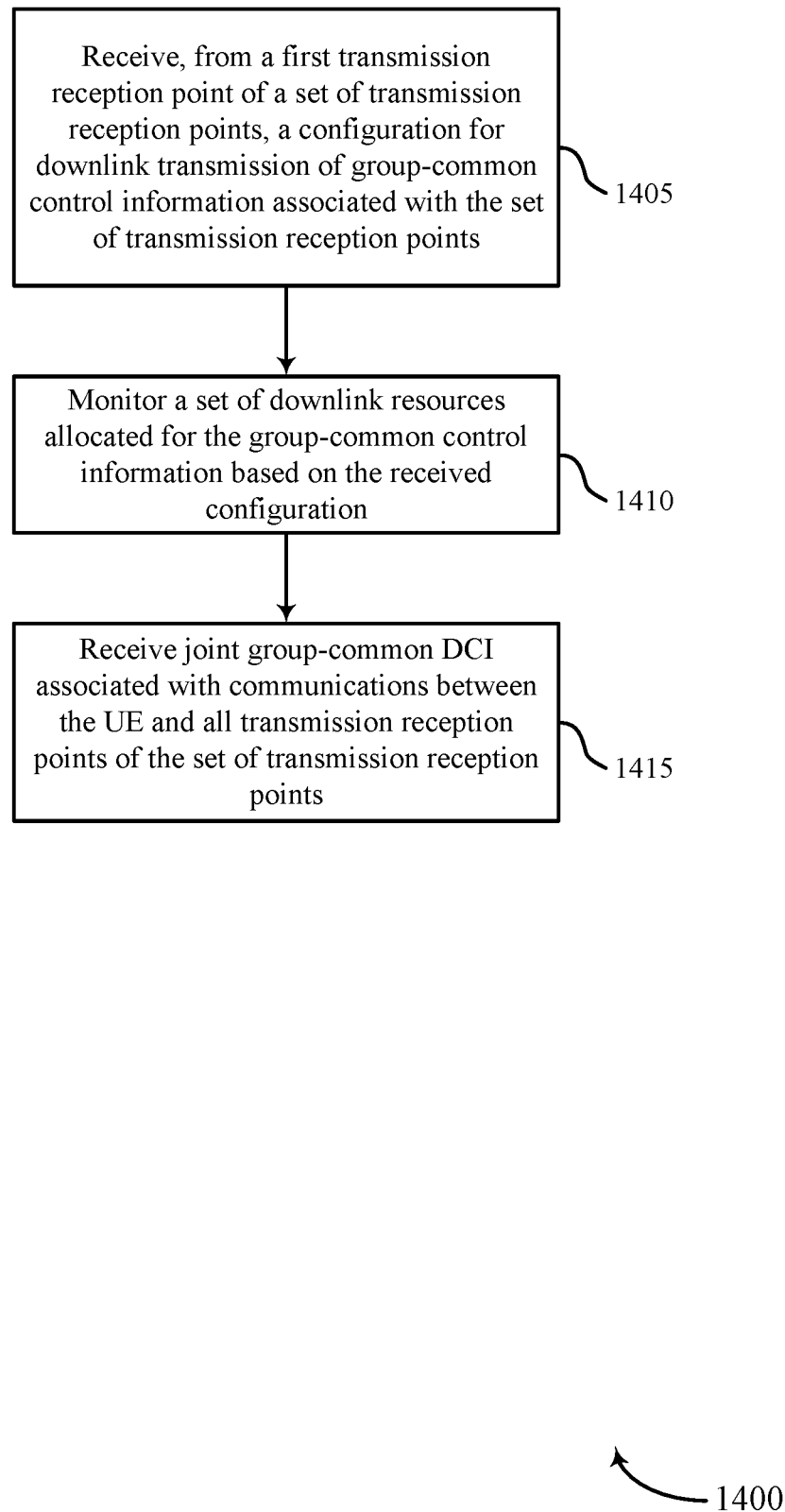

FIG. 14 shows a flowchart illustrating a method 1400 that supports group-common control information in accordance with aspects of the present disclosure. The operations of method 1400 may be implemented by a UE 115 or its components as described herein. For example, the operations of method 1400 may be performed by a group-common information manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a first TRP of a set of TRPs, a configuration for downlink transmission of group-common control information associated with the set of TRPs. The operations of 1405 may be performed according to the methods described herein. In some examples, aspects of the operations of 1405 may be performed by a configuration reception component as described with reference to FIGS. 5 through 8.

At 1410, the UE may monitor a set of downlink resources allocated for the group-common control information based on the received configuration. The operations of 1410 may be performed according to the methods described herein. In some examples, aspects of the operations of 1410 may be performed by a monitoring component as described with reference to FIGS. 5 through 8.

At 1415, the UE may receive joint group-common DCI associated with communications between the UE and all TRPs of the set of TRPs. The operations of 1415 may be performed according to the methods described herein. In some examples, aspects of the operations of 1415 may be performed by a group-common receiver as described with reference to FIGS. 5 through 8.

Figure 15:
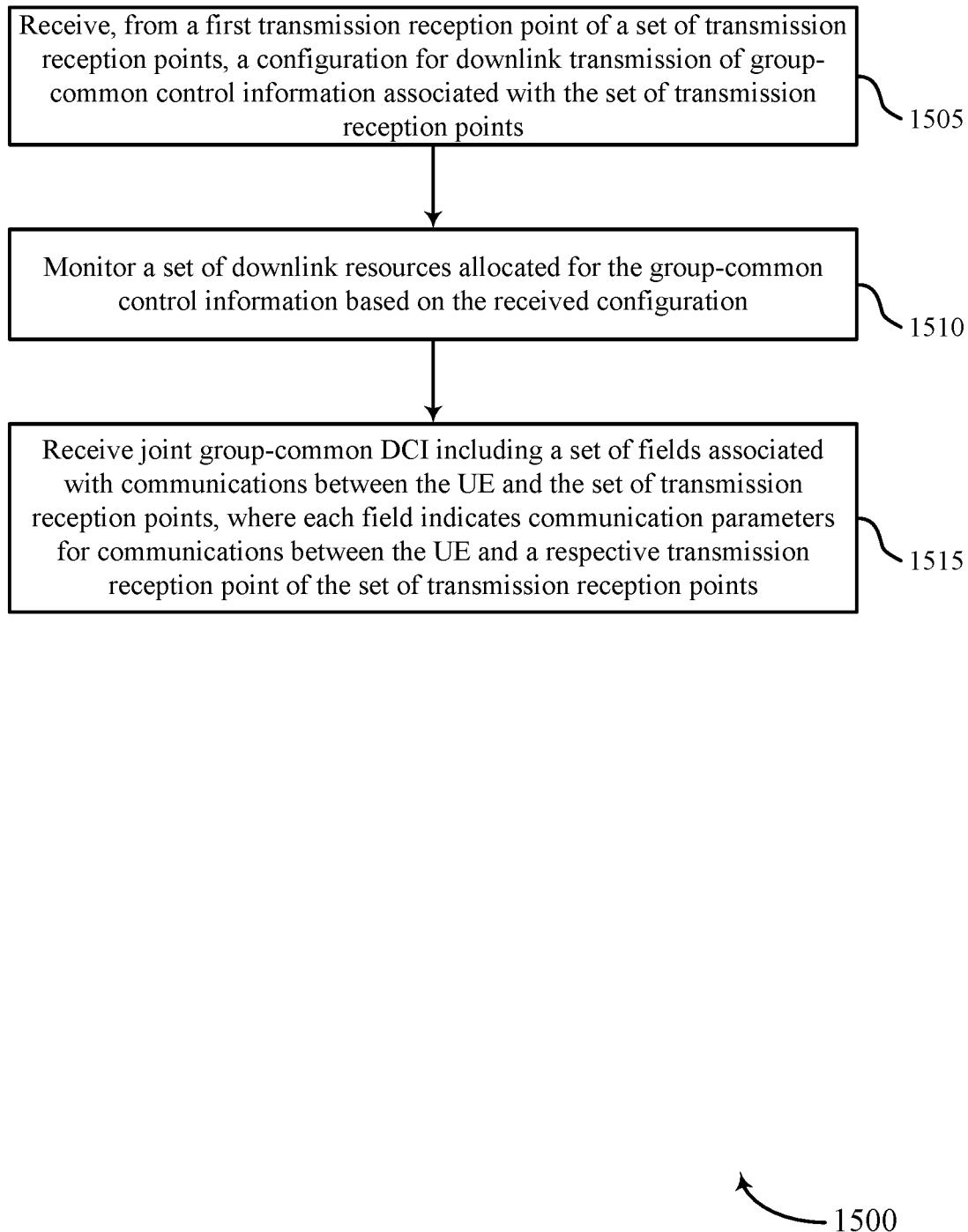

FIG. 15 shows a flowchart illustrating a method 1500 that supports group-common control information in accordance with aspects of the present disclosure. The operations of method 1500 may be implemented by a UE 115 or its components as described herein. For example, the operations of method 1500 may be performed by a group-common information manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a first TRP of a set of TRPs, a configuration for downlink transmission of group-common control information associated with the set of TRPs. The operations of 1505 may be performed according to the methods described herein. In some examples, aspects of the operations of 1505 may be performed by a configuration reception component as described with reference to FIGS. 5 through 8.

At 1510, the UE may monitor a set of downlink resources allocated for the group-common control information based on the received configuration. The operations of 1510 may be performed according to the methods described herein. In some examples, aspects of the operations of 1510 may be performed by a monitoring component as described with reference to FIGS. 5 through 8.

At 1515, the UE may receive joint group-common DCI including a set of fields associated with communications between the UE and the set of TRPs, where each field indicates communication parameters for communications between the UE and a respective TRP of the set of TRPs. The operations of 1515 may be performed according to the methods described herein. In some examples, aspects of the operations of 1515 may be performed by a group-common receiver as described with reference to FIGS. 5 through 8.

Figure 16:
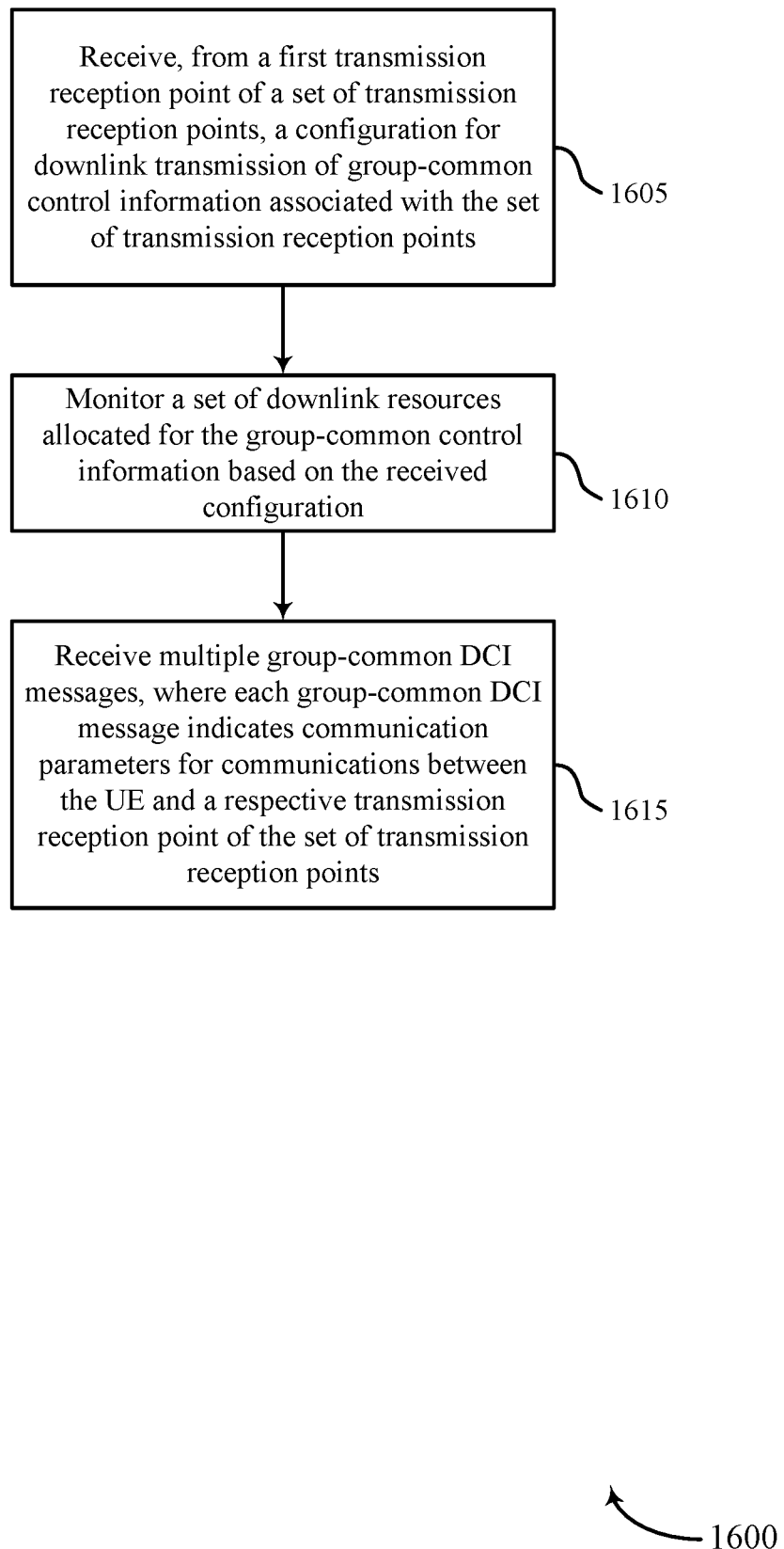

FIG. 16 shows a flowchart illustrating a method 1600 that supports group-common control information in accordance with aspects of the present disclosure. The operations of method 1600 may be implemented by a UE 115 or its components as described herein. For example, the operations of method 1600 may be performed by a group-common information manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a first TRP of a set of TRPs, a configuration for downlink transmission of group-common control information associated with the set of TRPs. The operations of 1605 may be performed according to the methods described herein. In some examples, aspects of the operations of 1605 may be performed by a configuration reception component as described with reference to FIGS. 5 through 8.

At 1610, the UE may monitor a set of downlink resources allocated for the group-common control information based on the received configuration. The operations of 1610 may be performed according to the methods described herein. In some examples, aspects of the operations of 1610 may be performed by a monitoring component as described with reference to FIGS. 5 through 8.

At 1615, the UE may receive multiple group-common DCI messages, where each group-common DCI message indicates communication parameters for communications between the UE and a respective TRP of the set of TRPs. The operations of 1615 may be performed according to the methods described herein. In some examples, aspects of the operations of 1615 may be performed by a group-common receiver as described with reference to FIGS. 5 through 8.

Figure 17:
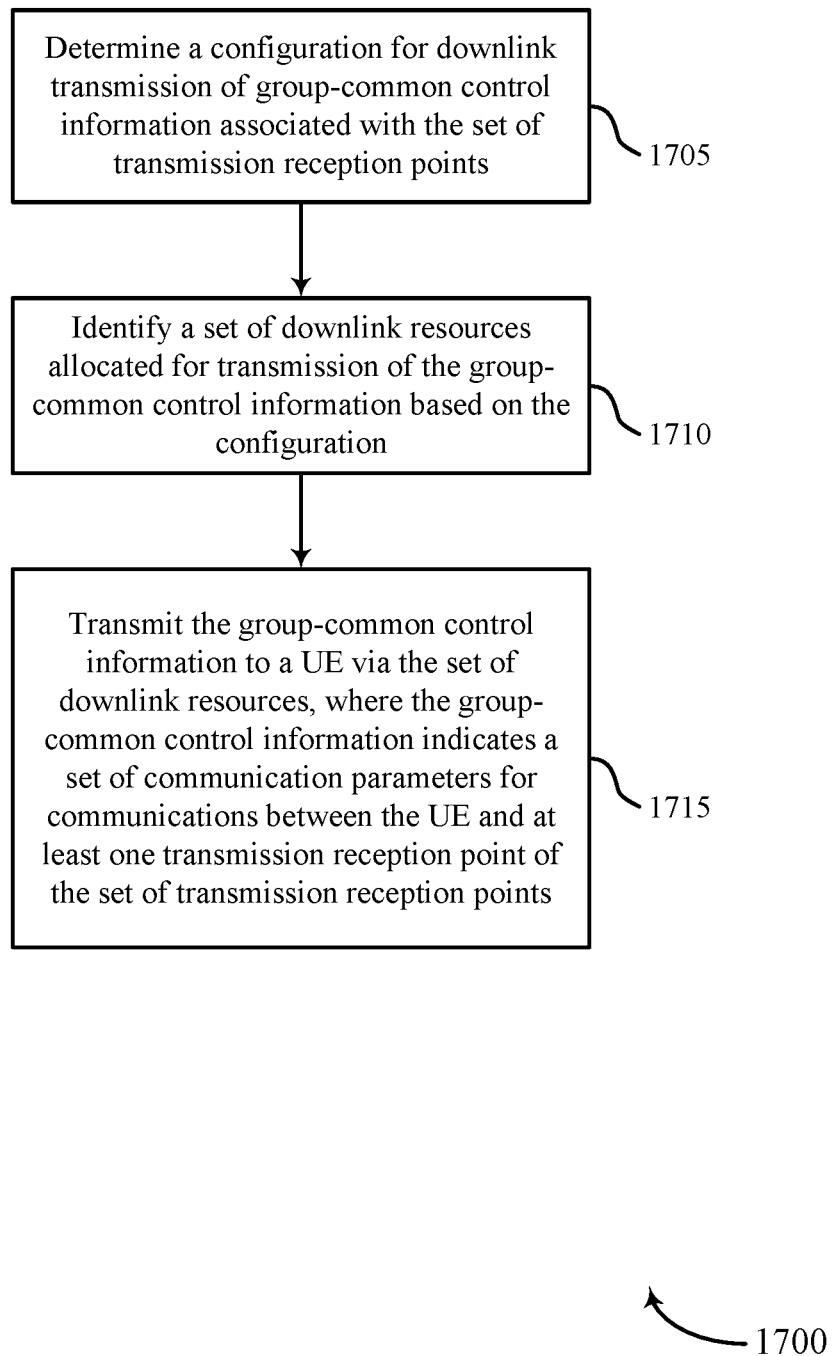

FIG. 17 shows a flowchart illustrating a method 1700 that supports group-common control information in accordance with aspects of the present disclosure. The operations of method 1700 may be implemented by a TRP 105 or its components as described herein. For example, the operations of method 1700 may be performed by a group-common information manager as described with reference to FIGS. 9 through 12. In some examples, a TRP may execute a set of instructions to control the functional elements of the TRP to perform the functions described herein. Additionally or alternatively, a TRP may perform aspects of the functions described herein using special-purpose hardware.

At 1705, the TRP may determine a configuration for downlink transmission of group-common control information associated with the set of TRPs. The operations of 1705 may be performed according to the methods described herein. In some examples, aspects of the operations of 1705 may be performed by a configuration manager as described with reference to FIGS. 9 through 12.

At 1710, the TRP may identify a set of downlink resources allocated for transmission of the group-common control information based on the configuration. The operations of 1710 may be performed according to the methods described herein. In some examples, aspects of the operations of 1710 may be performed by a resource identifier as described with reference to FIGS. 9 through 12.

At 1715, the TRP may transmit the group-common control information to a UE via the set of downlink resources, where the group-common control information indicates a set of communication parameters for communications between the UE and at least one TRP of the set of TRPs. The operations of 1715 may be performed according to the methods described herein. In some examples, aspects of the operations of 1715 may be performed by a group-common transmitter as described with reference to FIGS. 9 through 12.

Figure 18:
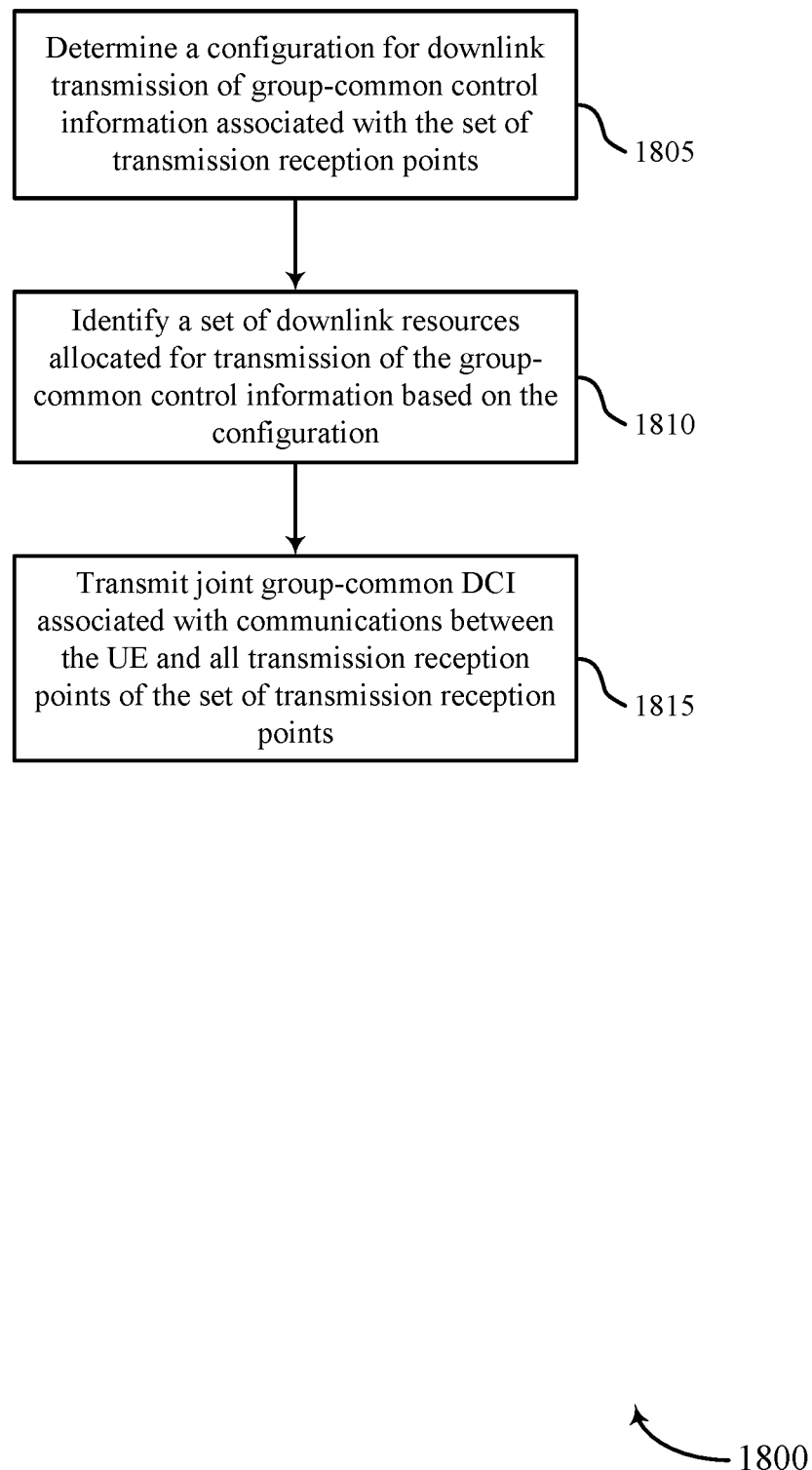

FIG. 18 shows a flowchart illustrating a method 1800 that supports group-common control information in accordance with aspects of the present disclosure. The operations of method 1800 may be implemented by a TRP 105 or its components as described herein. For example, the operations of method 1800 may be performed by a group-common information manager as described with reference to FIGS. 9 through 12. In some examples, a TRP may execute a set of instructions to control the functional elements of the TRP to perform the functions described herein. Additionally or alternatively, a TRP may perform aspects of the functions described herein using special-purpose hardware.

At 1805, the TRP may determine a configuration for downlink transmission of group-common control information associated with the set of TRPs. The operations of 1805 may be performed according to the methods described herein. In some examples, aspects of the operations of 1805 may be performed by a configuration manager as described with reference to FIGS. 9 through 12.

At 1810, the TRP may identify a set of downlink resources allocated for transmission of the group-common control information based on the configuration. The operations of 1810 may be performed according to the methods described herein. In some examples, aspects of the operations of 1810 may be performed by a resource identifier as described with reference to FIGS. 9 through 12.

At 1815, the TRP may transmit joint group-common DCI associated with communications between the UE and all TRPs of the set of TRPs. The operations of 1815 may be performed according to the methods described herein. In some examples, aspects of the operations of 1815 may be performed by a group-common transmitter as described with reference to FIGS. 9 through 12.

Figure 19:
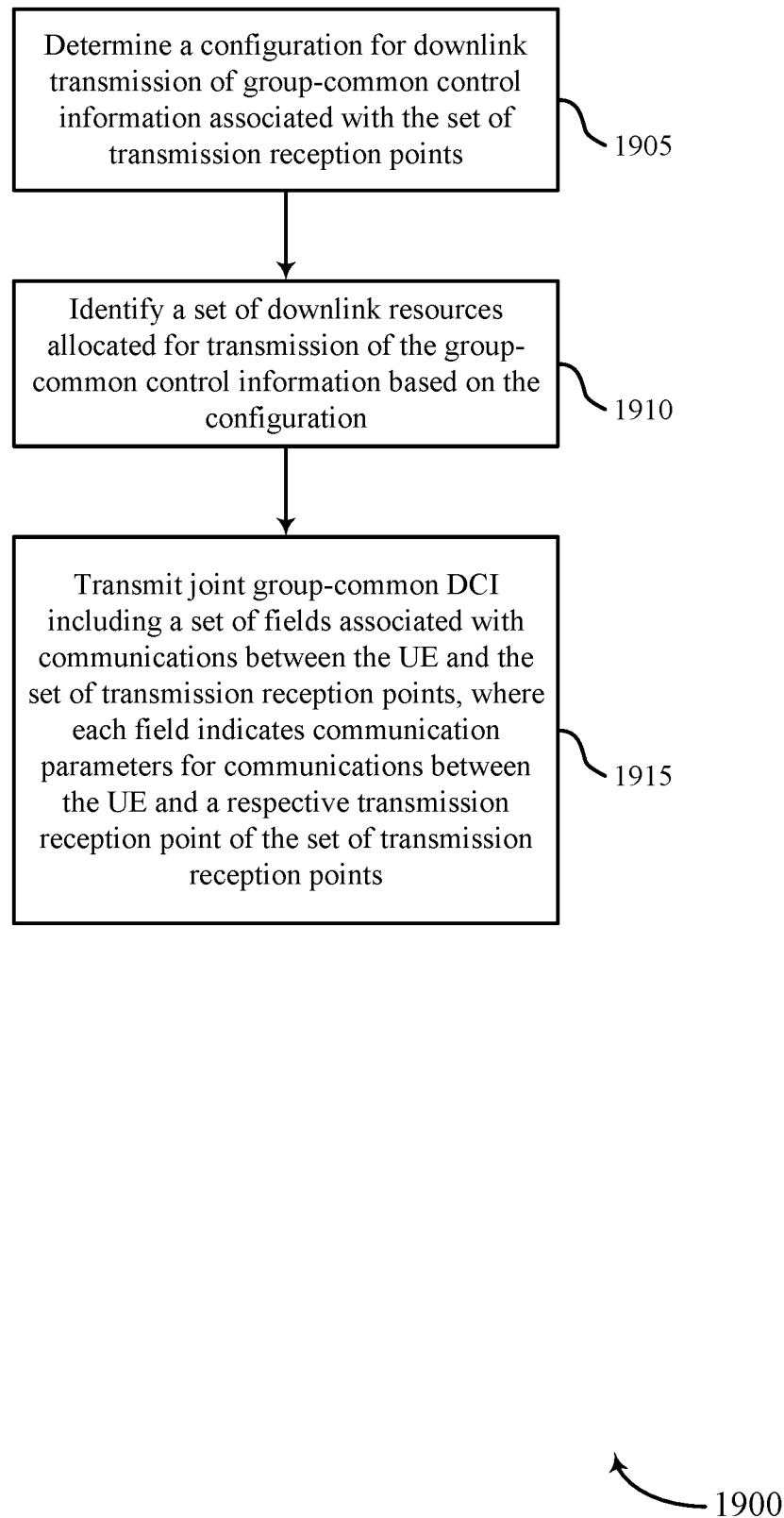

FIG. 19 shows a flowchart illustrating a method 1900 that supports group-common control information in accordance with aspects of the present disclosure. The operations of method 1900 may be implemented by a TRP 105 or its components as described herein. For example, the operations of method 1900 may be performed by a group-common information manager as described with reference to FIGS. 9 through 12. In some examples, a TRP may execute a set of instructions to control the functional elements of the TRP to perform the functions described herein. Additionally or alternatively, a TRP may perform aspects of the functions described herein using special-purpose hardware.

At 1905, the TRP may determine a configuration for downlink transmission of group-common control information associated with the set of TRPs. The operations of 1905 may be performed according to the methods described herein. In some examples, aspects of the operations of 1905 may be performed by a configuration manager as described with reference to FIGS. 9 through 12.

At 1910, the TRP may identify a set of downlink resources allocated for transmission of the group-common control information based on the configuration. The operations of 1910 may be performed according to the methods described herein. In some examples, aspects of the operations of 1910 may be performed by a resource identifier as described with reference to FIGS. 9 through 12.

At 1915, the TRP may transmit joint group-common DCI including a set of fields associated with communications between the UE and the set of TRPs, where each field indicates communication parameters for communications between the UE and a respective TRP of the set of TRPs. The operations of 1915 may be performed according to the methods described herein. In some examples, aspects of the operations of 1915 may be performed by a group-common transmitter as described with reference to FIGS. 9 through 12.

Figure 20:
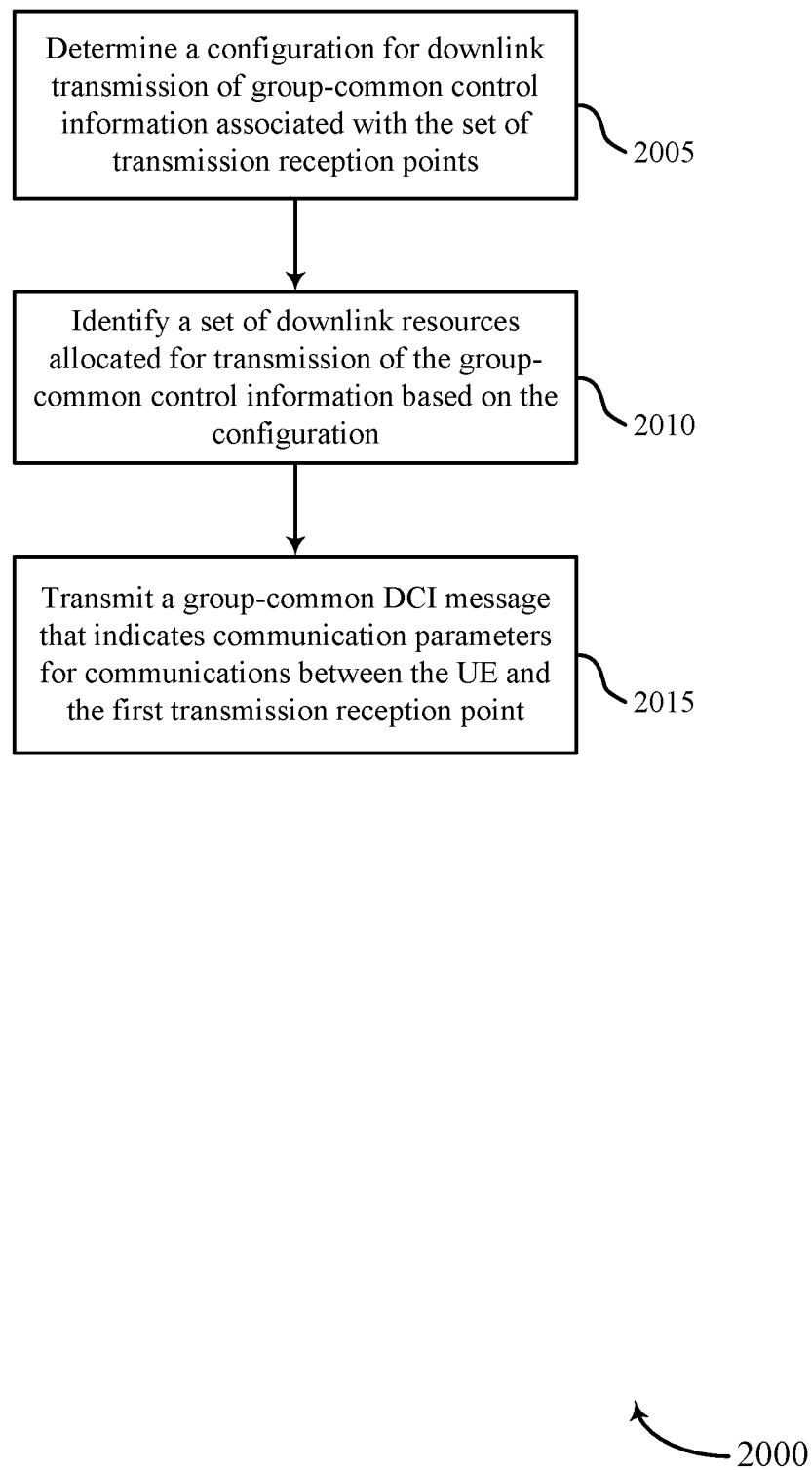

FIG. 20 shows a flowchart illustrating a method 2000 that supports group-common control information in accordance with aspects of the present disclosure. The operations of method 2000 may be implemented by a TRP 105 or its components as described herein. For example, the operations of method 2000 may be performed by a group-common information manager as described with reference to FIGS. 9 through 12. In some examples, a TRP may execute a set of instructions to control the functional elements of the TRP to perform the functions described herein. Additionally or alternatively, a TRP may perform aspects of the functions described herein using special-purpose hardware.

At 2005, the TRP may determine a configuration for downlink transmission of group-common control information associated with the set of TRPs. The operations of 2005 may be performed according to the methods described herein. In some examples, aspects of the operations of 2005 may be performed by a configuration manager as described with reference to FIGS. 9 through 12.

At 2010, the TRP may identify a set of downlink resources allocated for transmission of the group-common control information based on the configuration. The operations of 2010 may be performed according to the methods described herein. In some examples, aspects of the operations of 2010 may be performed by a resource identifier as described with reference to FIGS. 9 through 12.

At 2015, the TRP may transmit a group-common DCI message that indicates communication parameters for communications between the UE and the first TRP. The operations of 2015 may be performed according to the methods described herein. In some examples, aspects of the operations of 2015 may be performed by a group-common transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered TRP 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the TRPs 105 may have similar frame timing, and transmissions from different TRPs 105 may be approximately aligned in time. For asynchronous operation, the TRPs 105 may have different frame timing, and transmissions from different TRPs 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving, from a first transmission reception point of a plurality of transmission reception points, a configuration for downlink transmission of group-common control information associated with the plurality of transmission reception points, wherein the received configuration comprises an indication that at least two transmission reception points of the plurality of transmission reception points correspond to the group-common control information, an indication of one or more types of information included in the group-common control information associated with the plurality of transmission reception points, or a combination thereof;

monitoring a set of downlink resources allocated for the group-common control information based at least in part on the received configuration; and receiving, based at least in part on the monitoring, the group-common control information from one or more of the plurality of transmission reception points via the set of downlink resources, wherein the group-common control information indicates a set of communication parameters for communications between the UE and at least one transmission reception point of the plurality of transmission reception points.

2. The method of claim 1, wherein receiving the group-common control information comprises:

receiving joint group-common downlink control information (DCI) associated with communications between the UE and all transmission reception points of the plurality of transmission reception points.

3. The method of claim 1, wherein receiving the group-common control information comprises:

receiving joint group-common downlink control information (DCI) comprising a set of fields associated with communications between the UE and the plurality of transmission reception points, wherein each field indicates communication parameters for communications between the UE and a respective transmission reception point of the plurality of transmission reception points.

4. The method of claim 1, wherein receiving the group-common control information comprises:

receiving group-common downlink control information (DCI) from a transmission reception point over a control resource set (CORESET), wherein the CORESET is indicative of the transmission reception point.

5. The method of claim 1, wherein receiving the group-common control information comprises:

receiving multiple group-common downlink control information (DCI) messages, wherein each group-common DCI message indicates communication parameters for communications between the UE and a respective transmission reception point of the plurality of transmission reception points.

6. The method of claim 5, wherein each group-common DCI message has a same bit size.

7. The method of claim 5, further comprising:
receiving a first group-common DCI message from the first transmission reception point over a first control resource set (CORESET);
receiving a second group-common DCI message from a second transmission reception point over a second CORESET; and
determining communication parameters for the first transmission reception point based at least in part on an identifier (ID) associated with the first CORESET and communication parameters for the second transmission reception point based at least in part on an ID associated with the second CORESET.

8. The method of claim 5, further comprising:
identifying a set of Radio Network Temporary Identifiers (RNTIs) configured for the UE, each RNTI associated with communications between the UE and the respective transmission reception point of the plurality of transmission reception points; and
determining communication parameters for the first transmission reception point based at least in part on a first RNTI of the set of RNTIs.

9. The method of claim 8, further comprising:
determining communication parameters for a second transmission reception point based at least in part on a second RNTI of the set of RNTIs.

10. The method of claim 1, further comprising:
identifying a format of the group-common control information based at least in part on the configuration; and
determining the set of communication parameters for communications between the UE and the at least one transmission reception point of the plurality of transmission reception points based at least in part on the format of the group-common control information.

11. The method of claim 1, wherein the group-common control information comprises at least one of a downlink preemption indicator (PI), an uplink PI, a slot format indicator (SFI), a transmit power control (TPC) command, or any combination thereof.

12. The method of claim 1, further comprising:
receiving the configuration via a radio resource control (RRC) channel, wherein the configuration indicates a preemption indicator (PI) monitoring configuration; and
monitoring the set of downlink resources based at least in part on the PI monitoring configuration.

13. The method of claim 1, wherein the group-common control information comprises a downlink preemption indicator (PI).

14. The method of claim 13, wherein the downlink PI indicates a union of time-frequency resources punctured by transmissions from each of the plurality of transmission reception points.

15. The method of claim 13, further comprising:
determining a set of time-frequency resources punctured by transmissions from a transmission reception point of the plurality of transmission reception points based at least in part on the downlink PI.

16. The method of claim 13, further comprising:
determining a set of spatial layers punctured by transmissions from a transmission reception point of the plurality of transmission reception points based at least in part on the downlink PI.

17. The method of claim 13, wherein the group-common control information comprises a set of downlink PIs, each downlink PI associated with a respective transmission reception point of the plurality of transmission reception points and indicates resources preempted by the respective transmission reception point.

18. An apparatus for wireless communication at a user equipment (UE), comprising:
a processor,
memory coupled with the processor; and
instructions stored in the memory and executable by the processor to cause the apparatus to:
receive, from a first transmission reception point of a plurality of transmission reception points, a configuration for downlink transmission of group-common control information associated with the plurality of transmission reception points, the received configuration comprises an indication that at least two transmission reception points of the plurality of transmission reception points correspond to the group-common control information, an indication of one or more types of information included in the group-common control information associated with the plurality of transmission reception points;
monitor a set of downlink resources allocated for the group-common control information based at least in part on the received configuration; and
receive, based at least in part on the monitoring, the group-common control information from one or more of the plurality of transmission reception points via the set of downlink resources, wherein the group-common control information indicates a set of communication parameters for communications between the UE and at least one transmission reception point of the plurality of transmission reception points.

19. An apparatus for wireless communication at a user equipment (UE), comprising:
means for receiving, from a first transmission reception point of a plurality of transmission reception points, a configuration for downlink transmission of group-common control information associated with the plurality of transmission reception points, wherein the received configuration comprises an indication that at least two transmission reception points of the plurality of transmission reception points correspond to the group-common control information, an indication of one or more types of information included in the group-common control information associated with the plurality of transmission reception points, or a combination thereof;
means for monitoring a set of downlink resources allocated for the group-common control information based at least in part on the received configuration; and
means for receiving, based at least in part on the monitoring, the group-common control information from one or more of the plurality of transmission reception points via the set of downlink resources, wherein the group-common control information indicates a set of communication parameters for communications between the UE and at least one transmission reception point of the plurality of transmission reception points.

20. A non-transitory computer-readable medium storing code for wireless communication at a user equipment (UE), the code comprising instructions executable by a processor to:
receive, from a first transmission reception point of a plurality of transmission reception points, a configuration for downlink transmission of group-common control information associated with the plurality of transmission reception points, wherein the received configuration comprises an indication that at least two transmission reception points of the plurality of transmission reception points correspond to the group-common control information, an indication of one or more types of information included in the group-common control information associated with the plurality of transmission reception points, or a combination thereof;

monitor a set of downlink resources allocated for the group-common control information based at least in part on the received configuration; and receive, based at least in part on the monitoring, the group-common control information from one or more of the plurality of transmission reception points via the set of downlink resources, wherein the group-common control information indicates a set of communication parameters for communications between the UE and at least one transmission reception point of the plurality of transmission reception points.

* * * * *